(12) United States Patent
Chen et al.

(10) Patent No.: US 7,480,858 B2
(45) Date of Patent: Jan. 20, 2009

(54) ANALYZING WEBPAGES USING FUNCTION-BASED OBJECT MODELS FOR WEB PAGE DISPLAY IN A MOBILE DEVICE

(75) Inventors: Jin-Lin Chen, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 351 days.

(21) Appl. No.: 11/087,370

(22) Filed: Mar. 23, 2005

(65) Prior Publication Data

US 2005/0177586 A1    Aug. 11, 2005

Related U.S. Application Data

(63) Continuation of application No. 10/179,161, filed on Jun. 24, 2002, now Pat. No. 7,065,707.

(51) Int. Cl.
G06F 15/00 (2006.01)

(52) U.S. Cl. .......................... 715/234; 715/238

(58) Field of Classification Search .............. 715/501.1, 715/513, 205–207, 234, 236–238
See application file for complete search history.

(56) References Cited

U.S. PATENT DOCUMENTS

| | | | |
|---|---|---|---|
| 5,537,526 A | 7/1996 | Anderson et al. | |
| 5,704,029 A | 12/1997 | Wright | |
| 6,023,714 A | 2/2000 | Hill et al. | |
| 6,167,409 A * | 12/2000 | DeRose et al. | 715/513 |
| 6,230,174 B1 | 5/2001 | Berger et al. | |
| 6,300,947 B1 | 10/2001 | Kanevsky | |
| 6,345,279 B1 | 2/2002 | Li et al. | |
| 6,546,406 B1 * | 4/2003 | DeRose et al. | 715/513 |
| 6,556,217 B1 | 4/2003 | Makipaa et al. | |
| 6,564,263 B1 | 5/2003 | Bergman et al. | |
| 6,573,907 B1 | 6/2003 | Madrane | |
| 6,785,676 B2 | 8/2004 | Oblinger | |
| 2001/0054049 A1 | 12/2001 | Maeda et al. | |
| 2002/0099829 A1 | 7/2002 | Richards et al. | |
| 2002/0156807 A1 | 10/2002 | Dieberger | |
| 2003/0005159 A1 | 1/2003 | Kumhyr | |
| 2003/0037076 A1 | 2/2003 | Bravery | |
| 2003/0095135 A1 | 5/2003 | Kaasila et al. | |
| 2003/0101203 A1 | 5/2003 | Chen et al. | |
| 2004/0085341 A1 | 5/2004 | Hua et al. | |

(Continued)

OTHER PUBLICATIONS

Navarro, G, 'A Guided Tour to Approximate String Matching', ACM Computing Surveys, vol. 33, No. 1, Mar. 2001, pp. 31-88.*

(Continued)

*Primary Examiner*—Cesar B Paula
(74) *Attorney, Agent, or Firm*—Lee & Hayes, PLLC

(57) ABSTRACT

By understanding a website author's intention through an analysis of the function of a website, website content can be adapted for presentation or rendering in a manner that more closely appreciates and respects the function behind the website. A website's function is analyzed so that its content can be adapted to different client environments. A function-based object model (FOM) identifies objects associated with a website, and analyzes those objects in terms of their functions. Desktop oriented websites are adapted for mobile devices based on the FOM and on a mobile control intermediary language.

20 Claims, 12 Drawing Sheets

U.S. PATENT DOCUMENTS

| | | |
|---|---|---|
| 2004/0086046 A1 | 5/2004 | Ma et al. |
| 2004/0088726 A1 | 5/2004 | Ma et al. |
| 2004/0172484 A1 | 9/2004 | Hafsteinsson et al. |
| 2004/0187080 A1 | 9/2004 | Brooke et al. |
| 2005/0108637 A1 | 5/2005 | Sahota et al. |
| 2007/0156677 A1* | 7/2007 | Szabo ............................ 707/5 |

OTHER PUBLICATIONS

Karkkainen et al, 'Two and Higher Dimensional Pattern Matching in Optimal Expected Time', SODA '94: Proceedings of the fifth annual ACM-SIAM symposium on Discrete algorithms, 1994, pp. 715-723.*

Breslauer et al, 'A Lower Bound for Parallel String Matching', Annual ACM Symposium on Theory of Computing, 1991, pp. 439-443.*

"Schema Objects", Chapter 10, Oracle 8i Concepts, Release 8.15, 1999.

Cai et al, "Extracting Content Structure for Web Pages based on Visual Representation", ACM Transactions on Info. Sys., vol. 20, No. 1, Jan. 2002.

Ma et al., A Framework for Adaptive Content Delivery in Heterogeneous Network Enviornments, Jan. 2000, SPIE vol. 3969, Proceedings of MMCN00, San Jose, USA.

Refreshable Braille Displays, Mar. 11, 2000, retrieved from the Internet Oct. 26, 2005: http://web.archive.org/web/200000311151437/http://www.deafblind.com/display.html>, pp. 1-2.

Visually impaired, Aug. 22, 2002, retrieved from the Internet Oct. 26, 2005: <http://web.archive.org/web/20020822193408/http://linusdocs.org/HOWTOs/Access-HOWTO-3.html>, pp. 1-6.

Zhang, Adaptive Content Delivery: A New Application Area for Media Computing Research, Jan. 2000, Available at http://research.microsoft.com/china/papers/Adaptive_Content_Delivery.pdf.

"Abstraction", retrieved on Jan. 30, 2007, at <<http://www.webopedia.com/TERM/a/abstraction.html>>, Jupitermedia Corporation, 2007, pp. 1-2.

M.A. Smith & T. Kanade, "Video Skimming and Characterization through the Combination of Image and Language Understanding Techniques," Proc. of Computer Vision and Pattern Recognition, 1997 IEEE, pp. 775-781.

L. Itti & C. Koch, "Computational Modelling of Visual Attention," Nature Reviews/Neuroscience, vol. 2, Mar. 2001, pp. 1-11.

L. Itti, C. Koch & E. Niebur, "A Model of Saliency-based Visual Attention for Rapid Scene Analysis," IEEE Trans. on Pattern Analysis and Machine Intelligence, 1998, 5 pages.

L. Itti & C. Koch, "A Comparison of Feature Combination Strategies for Saliency-Based Visual Attention Systems," Proc. of SPIE Human Vision and Electronic Imaging IV (HVEI'99), San Jose, CA, vol. 3644, pp. 473-482, Jan. 1999.

Yu-Fei Ma & Hong-Jiang Zhang, "A New Perceived Motion Based Shot Content Representation," Microsoft Research China, 4 pages.

Yu-Fei Ma & Hong-Jiang Zhang, "A Model of Motion Attention for Video Skimming," Microsoft Research Asia, 4 pages.

Colin O'Toole et al., "Evaluation of Automatic Shot Boundary Detection on a Large Video Test Suite," School of Computer Applications & School of Electronic Engineering, Dublin City University, Glasnevin, Dublin, Ireland, Challenge of Image Retrieval, Newcastle, 1999, pp. 1-12.

T. Lin, H.J. Zhang, Q.Y. Shi, "Video Scene Extraction by Force Competition," IEEE Intl. Conference on Multimedia and Expo (ICME 001), Waseda University, Tokyo, Japan, Aug. 22-25, 2001, 4 pages.

Lee, Keansub et al., "Perception-Based Image Transcoding for Universal Multimedia Access," School of Electical Engineering Korea University, Seoul, Korea, 2001 IEEE, pp. 475-478.

Christopoulos, Charilaos et al., "The JPEG2000 Still Image Coding System: An Overview," IEEE Transactions on Consumer Electronics, vol. 46, No. 4, pp. 1103-1127, Nov. 2000.

Chen, Jinlin et al., "Function-based Object Model Towards Website Adaptation," (2001) Proc. of the 10th Int. WWW Conf. pp. 1-21.

Manola, "Towards a Web Object Model", Object Services and Consulting, Inc., at<<http://www.objs.com/OSA/wom.htm>>, Feb. 10, 1998, "60 pgs".

Smith, et al., "Scalable Multimedia Delivery for Pervasive Computing", ACM, Multimedia 99, 1999, pp. 131-140.

* cited by examiner

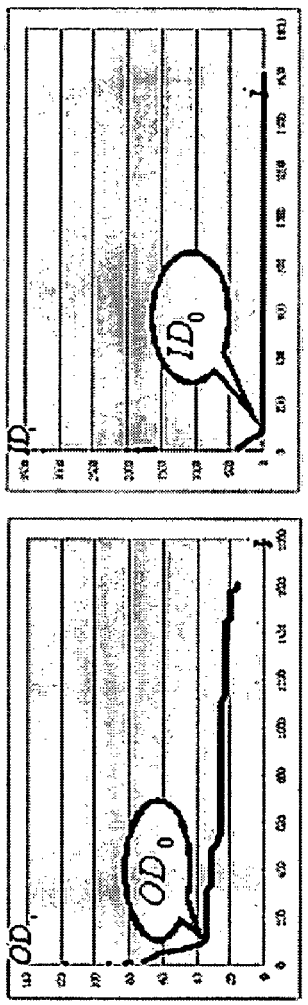
Fig. 6
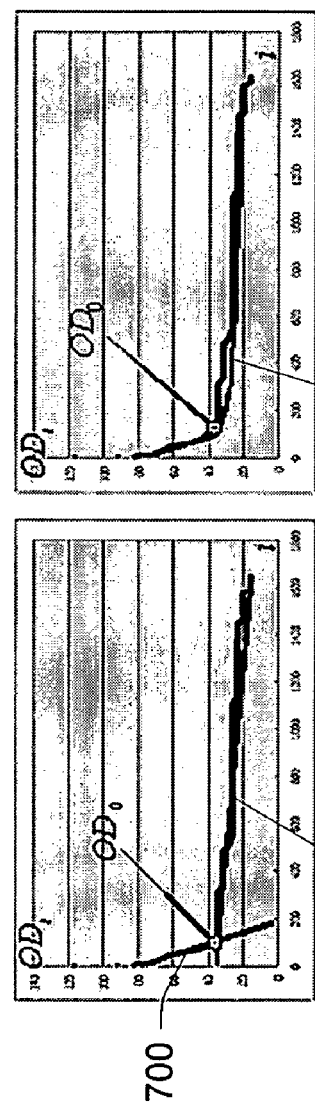
Fig. 7
Fig. 8

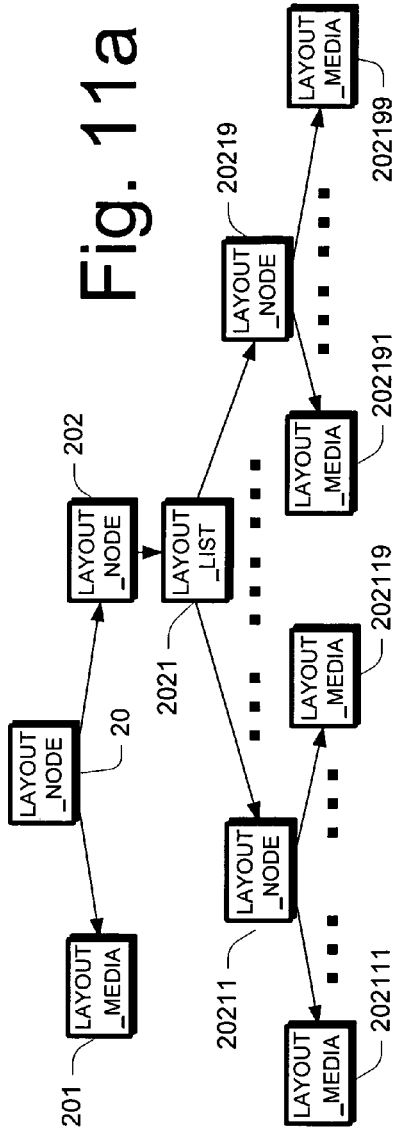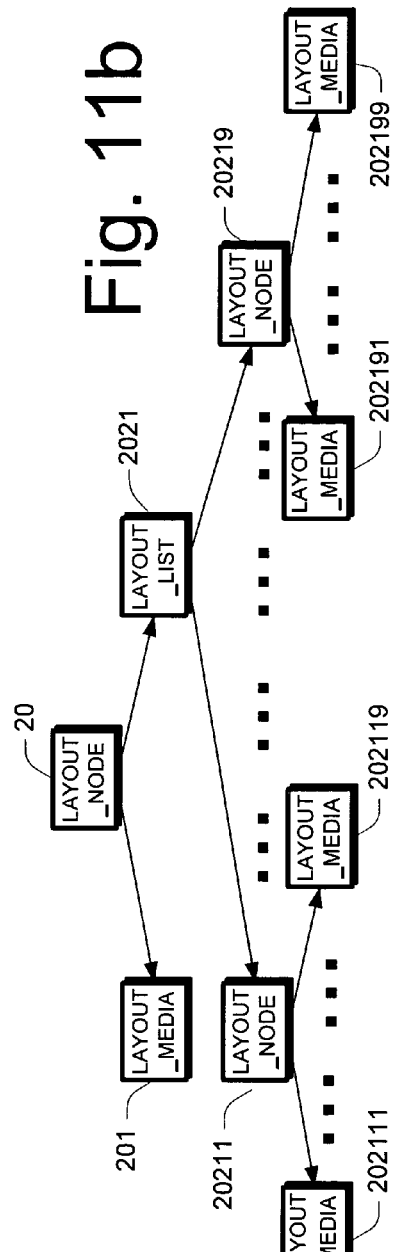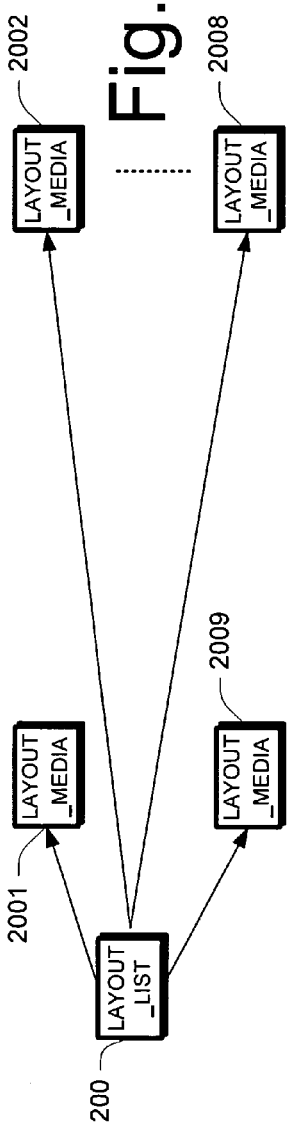

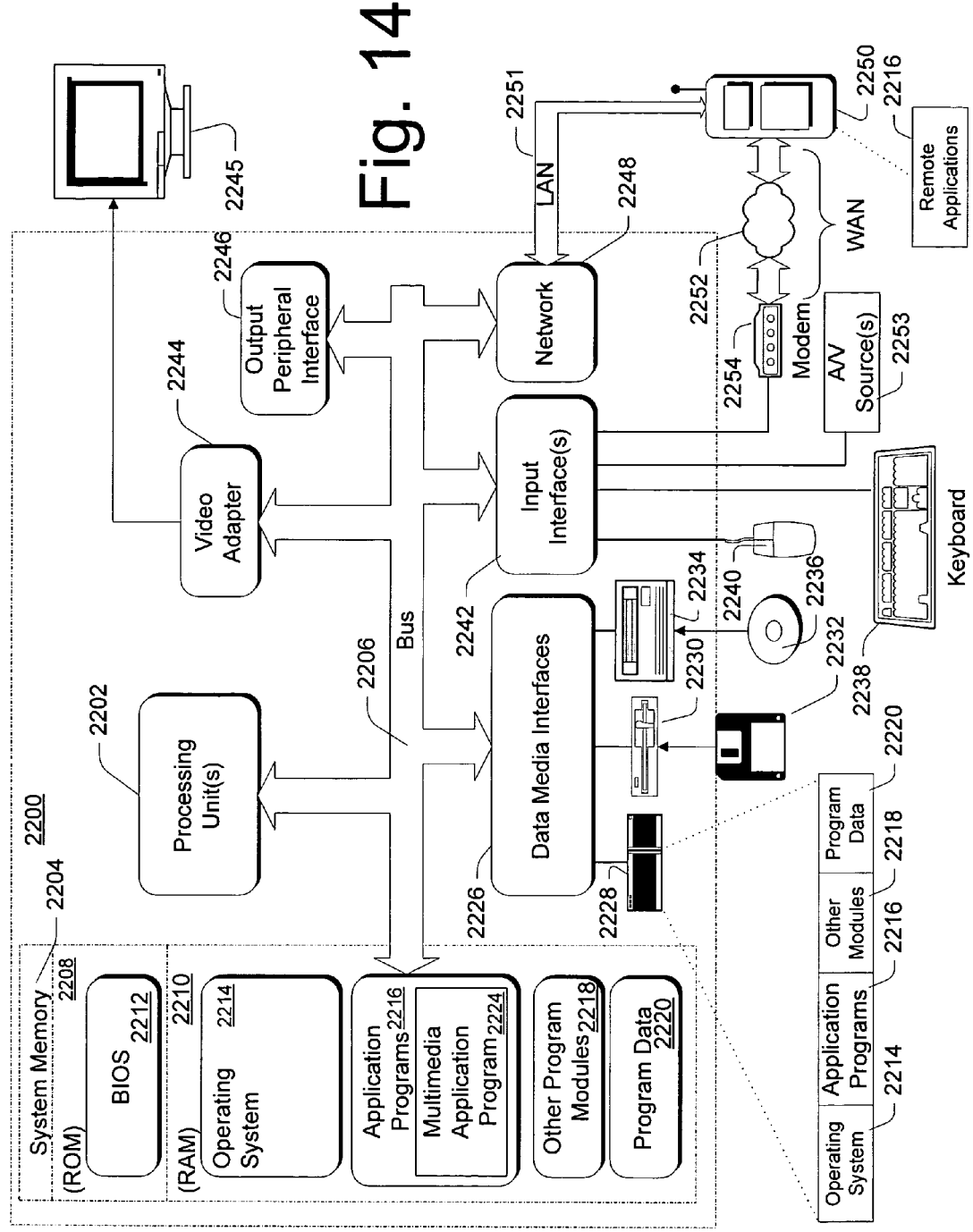

US 7,480,858 B2

ANALYZING WEBPAGES USING FUNCTION-BASED OBJECT MODELS FOR WEB PAGE DISPLAY IN A MOBILE DEVICE

RELATED APPLICATION

This application is a continuation of and claims priority to U.S. patent application Ser. No. 10/179,161, filed Jun. 24, 2002 (Now U.S. Pat. No. 7,065,707), the disclosure of which is incorporated by reference herein. This patent is related to U.S. patent application Ser. No. 09/893,335, filed on Jun. 26, 2001, titled "Function-based Object Model for Use in Web-Site Adaptation", which is incorporated herein in its entirety by reference.

TECHNICAL FIELD

This invention relates to methods and systems for adapting a web page for presentation or rendering on different mobile devices.

BACKGROUND

The increasing diversity in terms of devices, protocols, networks and user preferences in today's web has made adaptive capability critical for Internet applications. The term "adaptive capability" means having the ability to take web content presented in one form (such as that which would be presented in the form of a website on a desktop computer) and process it to present or display it in another form (such as that which would be presented on a handheld device).

To achieve adequate adaptation, it can become crucial to understand a website's structure and content function, as intended by the author of that website. Most of the previous works in this particular area achieve adaptation only under some special conditions due to the lack of structural information. Some works have attempted to extract semantic structural information from HTML tags either manually or automatically. These approaches, however, lack an overview of the whole website. In addition, these approaches are only suitable for HTML content. Furthermore, most of the approaches do not work effectively even for HTML pages because HTML was designed for both presentational and structural representation of content. Further misuses of structural HTML tags for layout purpose make the situation even worse. Cascade Style Sheets (as set forth in the W3C) attempts to compensate for this situation by representing the presentation information separately, but its application is quite limited. Moreover, the difficulty of extracting semantic structure from HTML tags is still not solved by Cascade Style Sheets. Accordingly, the results of previous semantic rule-based approaches for HTML content are not very stable for general web pages.

Smith et al., in *Scalable Multimedia Delivery for Pervasive Computing, Proc.,* ACM Multimedia 99, 1999, pp. 131-140, proposed a so-called InfoPyramid model to represent the structural information of multimedia content. However, the InfoPyramid model does not exist in current web content. Extensible Markup Language (XML) provides a semantic structural description of content by Document Type Description (DTD). However, a DTD is not a general solution because each application area would necessarily require its own special DTD. Additionally, XML does not take into consideration the function of content. Additionally, although Extensible Stylesheet Language (as set forth in the W3C) provides a flexible way of presenting the same content in different devices, it needs to be generated manually, which would be a labor-intensive work for authors.

Mobile devices that access the World Wide web vary greatly in their capabilities, which makes it quite difficult for web authors to provide web content that can be best presented in all these devices. Most of the web authors today still make use of HTML as their authoring language. Therefore, it would be very useful if an automatic adaptation approach can be realized.

Accordingly, this invention arose out of concerns associated with providing improved methods and systems for website adaptation for mobile devices.

SUMMARY

In accordance with the described embodiments, a function-based object model (FOM) for website adaptation is described. The FOM attempts to understand an author's intention that underlies an authored website. It does so by identifying and using object functions and categories. In accordance with FOM techniques, a website is analyzed to identify objects that are associated with that website. The objects are then classified as basic objects (BO) and composite objects (CO). Each object comprising part of a website serves certain functions. These functions are defined as either basic functions or specific functions. The functions reflect an author's intention regarding the purpose of a particular object.

Based on this observation, the FOM includes two complementary aspects: a so-called Basic FOM and a Specific FOM. The basic FOM represents an object by its basic functional properties, and the specific FOM represents an object by its category. Combining the Basic FOM and the Specific FOM together, a thorough understanding of an author's intention regarding a website can be ascertained. The described embodiments can provide an automatic approach for detecting the functional properties and category of an object for FOM generation.

FOM provides two level guidelines for web content adaptation: general rules based on Basic FOM, and specific rules based on Specific FOM. Through the rule-based approach, a website can thus be automatically adapted in a manner that preserves, to a desirable degree, the author's original intention with respect to the website.

Various inventive systems and methods adapt desktop oriented websites for mobile devices based on the FOM and on a mobile control intermediary language. While the FOM attempts to understand a website author's intention based on functional analysis of web content, the mobile control intermediary language enables the author to create web content that can be presented in various mobile devices.

BRIEF DESCRIPTION OF THE DRAWINGS

FIG. 6 is a graph that is useful in understanding aspects of one or more embodiments.

FIG. 7 is a graph that is useful in understanding aspects of one or more embodiments.

FIG. 8 is a graph that is useful in understanding aspects of one or more embodiments.

FIGS. 11a-11c are diagrams that are useful in understanding aspects of one or more described embodiments.

FIG. 14 is a block diagram of an exemplary computer environment in which various embodiments can be practiced.

DETAILED DESCRIPTION

Overview

By understanding a website author's intention through an analysis of the function of a website, website content can be adapted for presentation or rendering. In the context of this document, the terms "presentation" and "rendering", as such pertains to the display of content such as a web page, are used interchangeably. Adaptation can take place in view of different client environments (devices, networking conditions such as modem and LAN, and user preferences such as browsing for long term and short term goals) to name just a few. Adaptation can thus be effected in a manner that more closely appreciates and respects the function behind the website. Various systems and methods are described below that analyze a website's function so that its content can be adapted to various devices. A novel function-based object model automatically identifies objects associated with a website and analyzes those objects in terms of their functions. The function-based object model permits consistent, informed decisions to be made in the adaptation process so that web content is displayed not only in an organized manner, but in a manner that reflects the author's intention.

Function-Based Object Model

In the described embodiments, an "object" is the basic element of a hypermedia system and comprises a piece or a set of information that performs certain functions. According to the number of component objects an object contains, objects can be classified as basic objects and composite objects. In the discussion that follows, two function-based object models are described—(1) the basic function-based object model and (2) the specific function-based object model. The basic function-based object model is described in the context of both basic objects and composite objects. The specific function-based object model is discussed in the context of providing object categories that directly reflect a website author's intention. Such will become more apparent as the description below is read.

Basic Function-Based Object Model of a Basic Object

In a hypermedia system, a "basic object" is the smallest information body that cannot be further divided. Only as a whole can it perform certain functions. In the HTML context, a basic object is defined by a set of HTML tags that enclose no additional HTML tags. A basic object can perform or be associated with one or more of the following basic functions. It can provide some semantic information to users (i.e. provide some user-understandable meaning), guide users to other objects via a hyperlink, beautify or otherwise provide some type of visually) perceptible and/or pleasing effect on a page, or have an associated interface for users to interact or otherwise communicate with the system.

Figure 1:
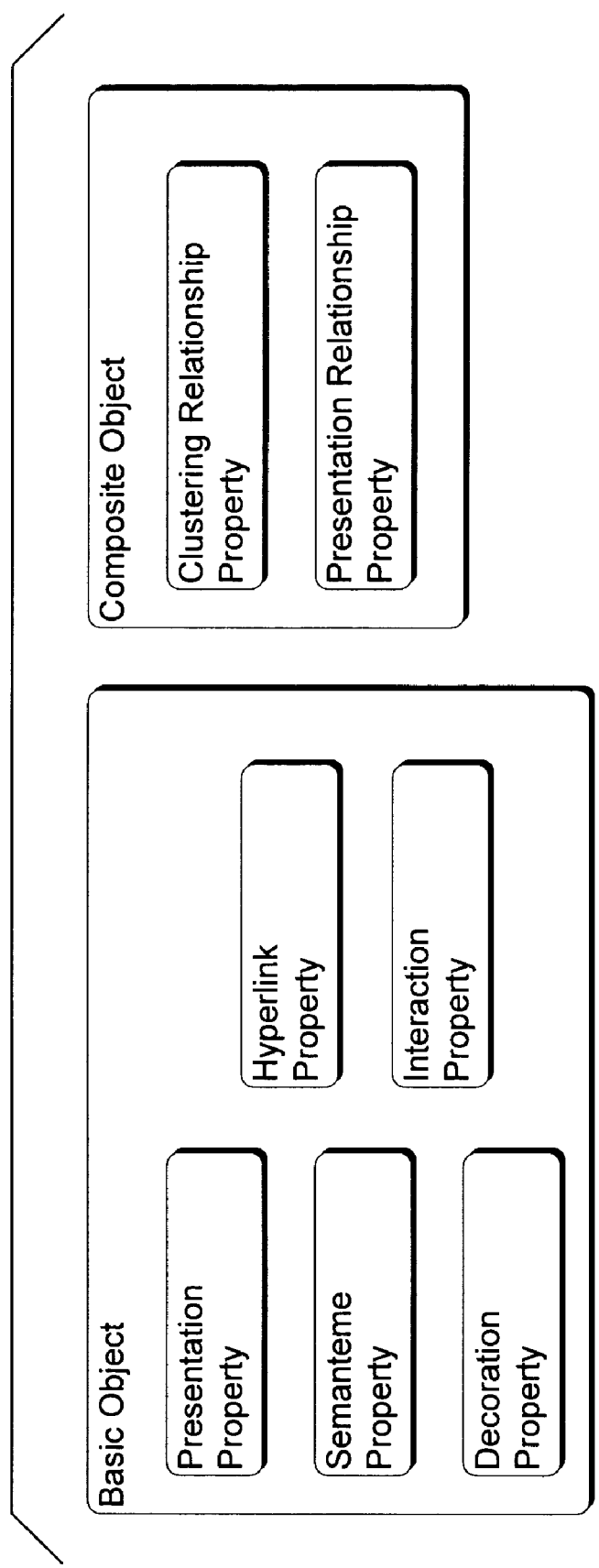
FIG. 1 is a block diagram that illustrates two exemplary objects in accordance with the described embodiments.

In accordance with the above-mentioned functions of the basic object, a basic object can be considered as having the following properties, which are also set forth in FIG. 1:

Presentation: defines the way that a basic object shows itself to or is otherwise presented to users. Presentation properties can include Media Type, Layout Format and Encoding Format, each of which can be assigned values as will become apparent below;

Semanteme: the content meaning of a basic object. Since XML has a good scheme for describing the semantic meaning of contents, here semanteme is more at semantic layer such as Keyword, Headline, Abstract and Content instead;

Decoration: pertains to the extent to which a basic object serves to beautify or decorate the web page. A decoration value can be assigned to a basic object and is indicated as x, x∈[0,1]. The higher the value of x, the more an object serves for decoration. If x=1, the basic object serves only a decoration function, without any other information. If x=0, the basic object has no decoration function;

Hyperlink: pertains to the object a basic object points to, and which has the following cases: (1) No Hyperlink, (2) Hyperlink to Other Object and (3) Hyperlink to Other Application; and Interaction: pertains to the interaction method of a basic object, and which has the following cases: Display (for presenting information), Button (for selecting list item or submitting information) and Input (for inputting information).

Accordingly, based on the properties described above, the function-based object model of a basic object can be represented as follows: Basic Object (Presentation, Semanteme, Decoration, Hyperlink, Interaction)

Figure 2:
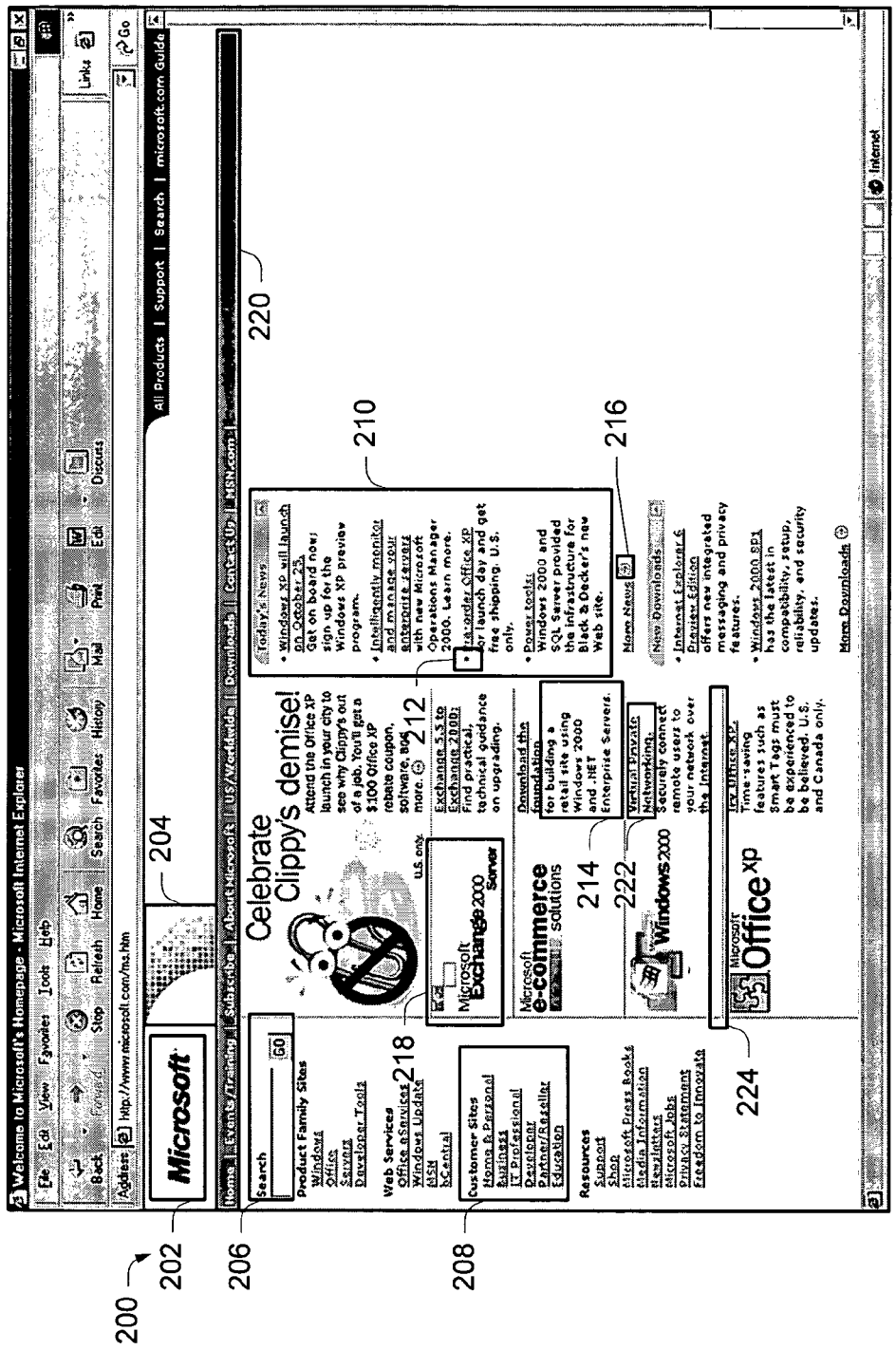
FIG. 2 is a diagram of an exemplary web page that illustrates exemplary objects in accordance with one or more embodiments.

FIG. 2 shows a web page 200 in the form of an index page that comprises multiple different objects 202-224, at least some of which comprise basic objects. These objects do not constitute all of the objects embodied by the web page. Rather, the enumerated basic objects are for illustrative purposes only.

As an example of a function-based object model, the function-based object model of basic object 214 can be described as follows:

Presentation:
    Layout Format: Left Aligned . . .
    Media Type: Text
    Encoding: Language: English, Content Type: Text/ HTML . . .
Semanteme: Abstract
Hyperlink: No Hyperlink
Decoration: 0
Interaction: Display

Basic Function-Based Object Model of a Composite Object

In the illustrated and described embodiment, a "composite object" comprises a set of objects (either basic objects or other composite objects) that perform some certain functions together. These objects are combined under some basic clustering rules. Since a web page is composed of composite objects and basic objects, and a website is a set of web pages, websites and web pages can themselves be composite objects.

In accordance with the described embodiment, the notion of a full representation is used to describe a tree-like structure that represents a composite object that has been unfolded to ascertain all of the children that comprise basic objects. As a composite object can itself contain other composite objects, this unfolding process can be a repeated process until all of the children comprising basic objects are discovered. A "root child" is a child that connects with the root directly. Root children are said to be "brother objects" to each other.

With respect to the functions of a composite object, such objects can have all of the functions of a basic object. Composite object also have additional functions. Specifically, composite objects can have a clustering function. The root children of a composite object are clustered based on some basic rules to perform certain goals that reflect an author's intention regarding the relationship and hierarchy of the root children.

Based on the clustering function, a composite object has its basic properties as follows and as set forth in FIG. 1:

Clustering Relationship
  Complement: root children of a composite object are complementary to achieve a goal, and, they have different basic properties.
  Parallel: root children of a composite object are of equal importance in achieving a goal, and, they generally have the same basic properties. If the root children have both similar and different properties, their relationship will be calculated by a weighted sum of the similarity of these properties. Then, a threshold will be set to decide whether they are complementary or parallel.
  Table: root children of a composite object can be clustered into parallel root children according to two semantic dimensions (normally row/column headers of a table).
Presentation Relationship: presentation order (time and space) of root children inside a composite object, and whether the root children are separable when they are presented. That is, whether the components should be displayed at the same time or different times, and whether they should be displayed as a whole or not.

Based on the properties described above, the function-based object model of a composite object is as follows:

CO={$O_i$, Clustering Relationship, Presentation Relationship|$O_i$ is the Root Children of the CO, i=1,2,..., $N_R$}, where $N_R$ is the total number of Root Children of The CO.

Figure 3:
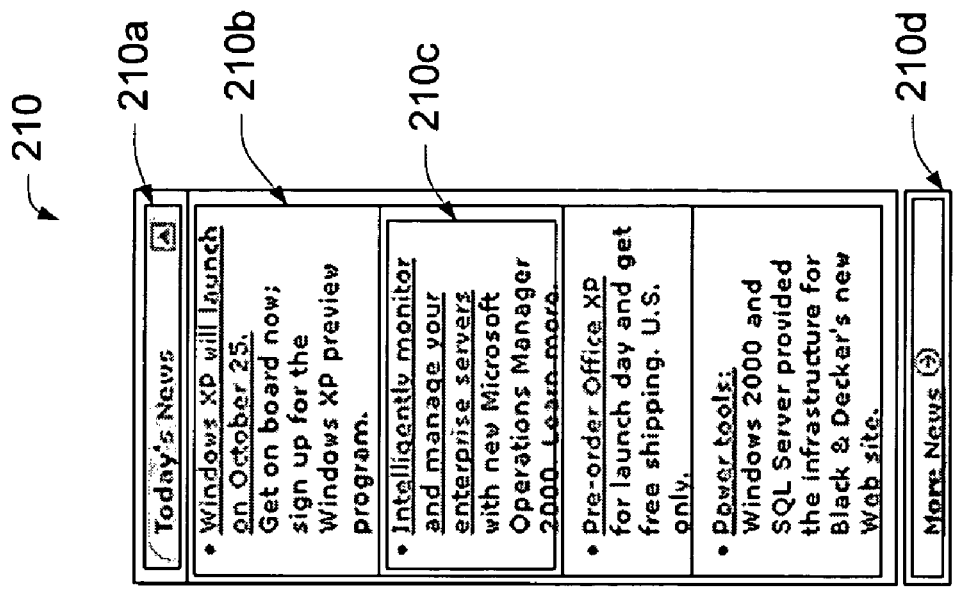
FIG. 3 is a diagram of an exemplary composite object, and illustrates various objects that comprise the composite object.
Figure 4:
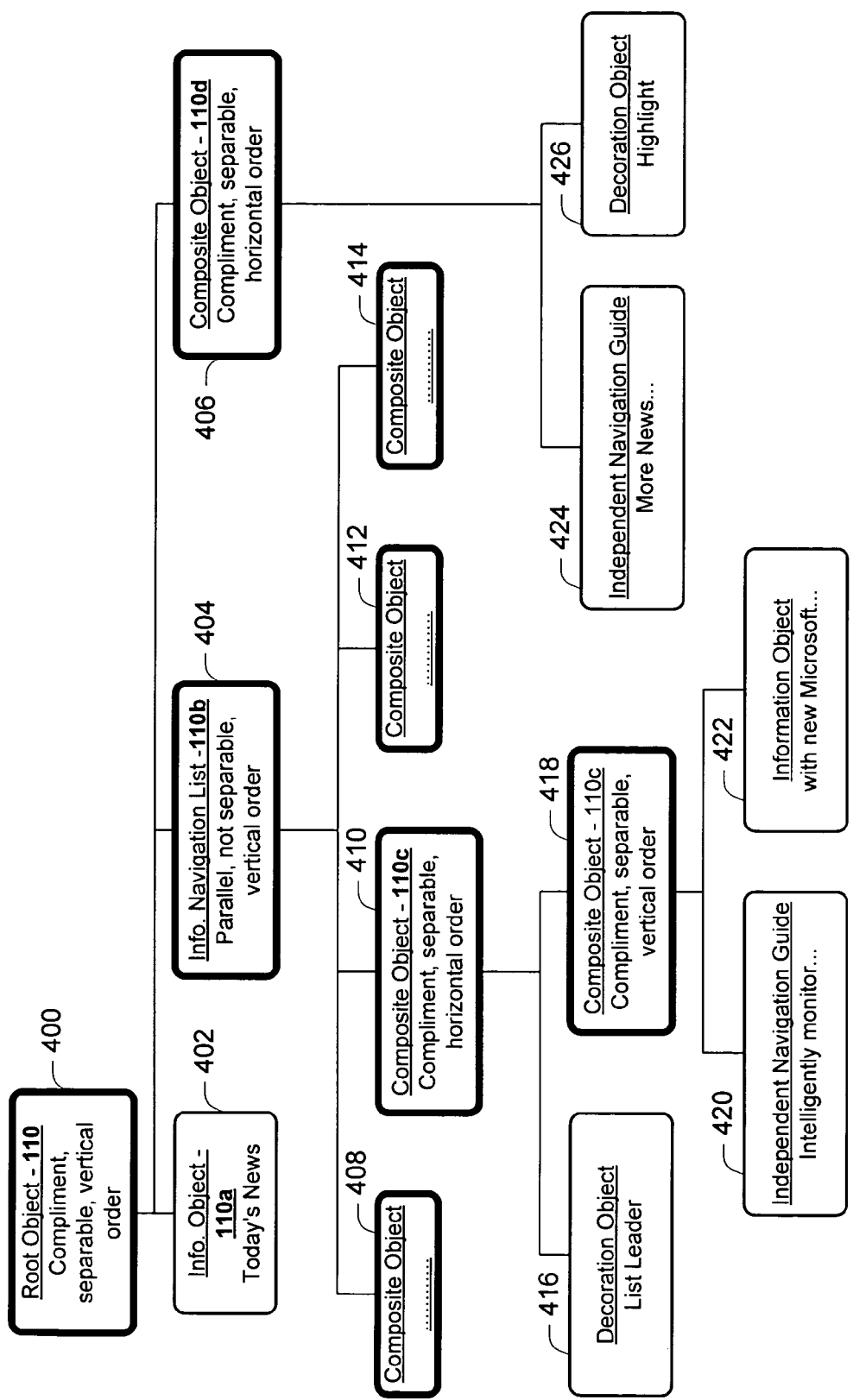
FIG. 4 is a diagram of an exemplary full representation in accordance with one embodiment.

To assist in further understanding composite objects, the reader is referred to FIG. 3. There, various objects within and comprising part of composite object 210 are designated respectively at 210a, 210b, 210c, and 210d. The function-based object model for object 210 is as follows:

Root Children: 210a, 210b, 210d
Clustering Relationship: Complement
Presentation Relationship: Vertical; Separable FIG. 4 shows a somewhat abbreviated full representation of object 210. There, the composite objects are designated by the darker boxes. Notice that the various composite objects are broken down into their basic object constituent parts. For example, notice that root object 400 comprises three root children 402, 404, and 406 corresponding respectively to objects 210a, 210b, and 210d. Child 404 comprises four children (408, 410, 412, and 414), each of which are composite objects themselves. Child 410 comprises two children—one child 416 corresponds to a basic object, the other child 418 corresponds to a composite object. Child 418, in turn, has two children 420, 422, each of which comprises a basic object.

Specific Function-Based Object Model—Category of an Object

In accordance with the described embodiment, the specific function of an object in a given application environment is represented by its category, which reflects an author's intention directly. There can be many object categories according to various purposes. In the discussion below, the HTML content of the FIG. 2 web page is utilized as an example to describe various object categories.

Exemplary Object Categories

Information Object: presents content information. An example of an information object is object 214.

Navigation Object: provides a navigation guide. An example of a navigation object is object 218. In addition, there are different sub-categories of navigation objects as follows:

Navigation Bar: a composite object with parallel navigation objects as root children. The composite object exists in a set of web pages in the website to provide a global navigation guide. A navigation bar has the following formats: Normal Navigation Bar, Frame, Menu (e.g. object 220) and Map.

Navigation List: a composite object with parallel navigation objects as root children. The composite object exists only in a single web page to provide local navigation guide. A navigation list has the following format: Normal Navigation List (object 208), Informative Navigation List (object 210), Narrative Navigation List and Map List. In an Informative Navigation List, each navigation object is followed by an information object as an introduction. In a Narrative Navigation List, all navigation objects are embedded in a piece of narrative information.

Independent Navigation Guide: an object with a hyperlink property and/or introductory information to provide a navigation guide to a certain piece of content. An independent navigation guide generally has weak relationship with other objects around it. An example of an independent navigation guide is object 222.

Interaction Object: provides user side interaction and has the following formats: User Selection (for selecting items from a list of available information), User Query (for inputting query information, e.g. object 206) and User Submission (for uploading information).

Decoration Object: serves for decoration purpose only (e.g. object 204) and can have the following format: Separator (e.g. object 224), List Leader (e.g. object 212), Highlight (e.g. object 216) and Background.

Special Function Object: performs special functions such as AD (advertising), Logo, Contact, Copyright, Reference, etc.

Page Object: serves as the basic document of a website for presenting related information and has two basic sub-categories: Index Page and Content Page.

Index Page: serves mainly as navigation guide to other pages. The web page of FIG. 2 is an example of an index page.

Content Page: delivers semantic information to the user.

Automatic FOM Analysis for HTML Websites

Although it is desirable, in the authoring phase, for authors to add additional information for purposes of assisting in the generation of function-based object models, authors actually tend to not do so. In addition, many authors would likely prefer to not be burdened with such extra tasks. Thus, it becomes important, in some embodiments, to automatically analyze the function of content in a website. In the discussion below, an automatic method for generating basic and specific function-based object models, such as those described above, is described. Although the discussion is focused on HTML websites, it is to be appreciated and understood that the described approach can be extended to other languages.

Basic FOM Generation

Before a basic function-based object model (such as that which is described above) is generated, the objects are first detected. In HTML content, a basic object is a non-breakable element within two tags, or an embedded Object. There is no other tag inside the content of a basic object. According to this criteria, it is a fairly simple task to ascertain all of the basic objects inside or comprising a website.

Based on the observation that objects in the same category generally have consistent visual styles, and they are separated by apparent visual boundaries from objects in other categories, composite objects can be detected by conducting a layout analysis of a web page.

Any suitable object detection techniques can be used. In the discussion that follows, an exemplary method for automatically analyzing the structure of HTML pages based on detecting visual similarities of objects is described. It is to be appreciated and understood that the described approach constitutes but one exemplary way in which this can be done.

Visual Similarity of HTML Objects

In the HTML environment, it is fairly common for content to be divided into categories where each category holds records of similar or related subtitles. In addition, records in one category are normally organized in a manner having a consistent layout style. The basic idea of the approach about to be described is to detect these visual cues, records and categories. In this specific context of object detection, the following terms will be used:

Basic object: Non-breakable visual HTML objects that do not include other tags (such as texts or tags as <IMG>, <HR>) or are representations of one embedded media object.

Composite object: An ordered set of objects that consists of at least one basic object or other composite object and these objects must be adjacent if they are rendered. The order of these elements is normally defined by reading habits. In following discussions, a composite object C is represented as a string of elements $\{e_1, e_2, \ldots, e_n\}$, where $e_i$ comprises basic objects or other composite objects.

Group object: Special composite objects where all elements are basic objects and these elements are rendered on the same text line without deliberate line breaks by visual browsers.

List object: Special composite objects where all elements satisfy some consistency constraint.

Structured Document: documents converted to hierarchical structures of composite objects.

Visual Similarity of Basic Objects

During object detection, the HTML document is first parsed. During the parsing process, when identifying basic objects, rendering parameters are extracted by keeping a stack of tags that affect text attributes like font face, styles, size, and color. For other embedded media objects like images, information is extracted from tag attributes, or by analyzing their file headers. According to these parameters, fuzzy comparison rules are defined that assist in deciding visual similarity. Table 1 provides a few examples of some fuzzy comparison rules that can be used for text objects, in which x is the similarity between objects.

TABLE 1

Starting from $x = 1.0$

Compare key attributes (like $\langle H1 \rangle \ldots \langle H6 \rangle, \langle A \rangle$): $x = x \cdot \begin{cases} \text{Key\_Modifier,} & \text{Not Equal} \\ 1, & \text{Equal} \end{cases}$ Compare font size attribute: $x = x \cdot \begin{cases} \text{Size\_Modifier,} & \text{Not Equal} \\ 1, & \text{Equal} \end{cases}$

...

Compare text length: $x = x \cdot \left( \frac{\min(length1, length2)}{\max(length1, length2)} \right)^{\text{Adjust\_factor}}$

Visual Similarity of Composite Objects

The visual similarity of composite objects is based on that of basic objects. To keep appropriate semantic granularities, group objects are defined as content that is considered tightly related from the visual cue-based view (such as sentences and paragraphs). Group objects are not broken up during the analysis. A basic object is treated as a composite object with only one element when it is compared with other composite objects. In addition, list objects have their specialties because they are used to represent detected categories and records. And instead of using whole objects, typical elements are picked from list objects to compare with others.

In the illustrated example, two kinds of visual similarity measurements are defined:

Approximate Similarity: Comparison of two strings that enables weighted mismatches and omissions.

Parallel Similarity: Comparison of two strings that enables only weighted mismatches.

From the definitions above, it will be appreciated that an approximate similarity is more robust than a parallel similarity, if there are outliers in strings. Parallel similarity can simply be an O(n) one-by-one comparison. Approximate similarity can be a bit more complex. Pseudo code of a suitable approximate similarity measurement algorithm is listed below in Table 2, and will be understood by those of skill in the art. In the solution, dynamic programming is used to solve the problem.

TABLE 2

Approximate String Compare Algorithm:

compareItem(x, NULL) = skip_weight(x);
compareItem(simpleX, simpleY) = defined by Table 1;

TABLE 2-continued

Approximate String Compare Algorithm:

```
compareItem(strI[1..lthI], strJ[1..lthJ])
{
    dim cmp[0..lthJ];
    cmp[0] = 1; lastv10 = 1;
    for(j=1; j<=lthJ; j++) {
        cmp[j] = cmp[j-1] * compareItem(NULL, strJ[j]));
    }
    for(i=1; i<=lthI; i++) {
        lastv11 = cmp[0];
        cmp[0] = lastv10 * compareItem(strI[i], NULL);
        lastv10 = cmp[0];
        for(j=1; j<=lthJ; j++) {
            v11 = lastv11      * compareItem(strI[i], strJ[j]);
            v10 = cmp[ j ]     * compareItem(strI[i], NULL );
            v01 = cmp[j-1]     * compareItem(NULL,   strJ[j]);
            lastv11 = cmp[j];
            cmp[j] = max(v11, v10, v01);
        }
    }
    return cmp[lthJ];
}
```

Pattern Detection and Construction of Document Structures

Visual similarity patterns do not appear as very stable forms even with so-called "well composed" web pages. Their lengths can change, and outliers in sequences are common. In addition, typically there are not known boundaries to separate potential patterns. In the approach about to be described, a start is made from an exact pattern detection method based on suffix trees, and then an expansion of exact patterns according to approximate similarity. Each time a composite object is constructed, it is checked for potential patterns. These patterns are then converted to list objects. Adjacent list objects are checked for visual similarities and are merged if they are similar.

In the discussion that follows, some of the terms that are used are defined as follows. For composite object $C=(e_1, e_2, \ldots, e_n)$, an object o is represented by a sub-string of C as $\{e_s, \ldots e_{s+l-1}\}$. Visual pattern p is represented as a set of "equal" objects $\{o_1, \ldots, o_m\}$ and sometimes represented by a typical element $o_p$ of the pattern. Also followed are some heuristics as listed below for locating possible patterns.

Equal Judgment: Two objects are equal only if their similarity measurement is above a threshold $E_p$.

Minimal Frequency: One pattern must contain at least $F_p$ objects.

No Overlap: Objects in one pattern do not overlap with each other.

Alignment: Objects in one pattern are normally aligned tidily (no zigzags).

Paragraphs: Content that resides in the same unbroken text line should be tightly related and thus will be treated as one element.

Minimal Deviation: Standard deviations of objects' distributions (positions) and lengths in potentially better patterns should be smaller.

Maximum Coverage: The potentially better patterns should have bigger coverage of elements in C.

Sub-pattern Replacement: If all objects in a pattern are concatenations of "equal" sub strings (sub-pattern), then these objects are expanded to sub-strings. Assume a pattern as $\{\{e_1, \ldots, e_m\}, \{e_{m+1}, \ldots, e_{m+k}\}, \ldots\}$ and $e_i==e_j, \forall i, j$, then the pattern is expanded to $\{e_1, \ldots, e_m, e_{m+1}, \ldots, e_{m+k}, \ldots\}$.

Significant Token: Records in one category should have similar prefix elements.

Quantization

To reduce the complexity of frequency counting, we first cluster candidate elements according to similarity measurements between each element. These clusters are then labeled with unique identifiers. Elements in the same cluster are assigned with the same identifier, and are considered as equal to each other. A clustering algorithm such as the one described in Easter et al., *A Density-Based Algorithm for Discovering Clusters in Large Spatial Databases with Noise*, In Proc KDD'96, 1996, can be used because we do not know the number of possible clusters at the beginning. Another reason is that the heuristics have specified two values ($E_p$ and $F_p$) that are just the epsilon and minimal density.

Eps-neighbourhood: $N_{Eps}(e)=\{e' \in C | similarity(e,e') \geq E_p\}$, where $E_p$ is from "equal judgment". (It will be the same as originally defined in Easter et al., if we use 1/similarity$(e,e') \leq 1/E_p$ as the condition.)

Core point condition: $|N_{Eps}(e)| \geq F_p$, where $F_p$ is defined by "minimal frequency".

For $C=\{e_1, e_2, \ldots, e_n\}$, if the clustering result is m clusters as $T_1=\{e_a, e_b, \ldots, e_x\}, \ldots T_m=\{e_s, e_t, \ldots, e_y\}$, we construct a token string $T=\{t_1, t_2, \ldots, t_n\}$ with $t_i$ equal to the cluster identifier that $e_i$ belongs to. The token string is then passed to the frequency counting stage. In following discussions we use an example as $C=\{e_1, e_2, \ldots, e_{13}\}$ and clustering result as T={C, A, B, D, A, B, E, D, A, B, C, A, B} with 4 clusters labeled as ABCD and one outlier labeled as E. (In this illustrated example, a minimal frequency of 3 is selected. Thus only AB can be clusters and CDE are all noise.)

Frequency Counting

Frequencies of quantized patterns are counted efficiently using a suffix tree representation of token string T. Starting from the root node, the "label of path" of a node is actually what we called a "pattern", and leaves under the node are positions of the pattern in a string. The number of leaves under each node is the frequency of the pattern. Table 3 below gives an example of pattern counting. A suitable algorithm to create the suffix tree is described in Ukkonen, *On-line Construction of Suffix Trees,* Algorithmica, 14(3), September 1995, pp. 249-260.

TABLE 3

Pattern frequency counting of sequence 'CABDABEDABCAB':

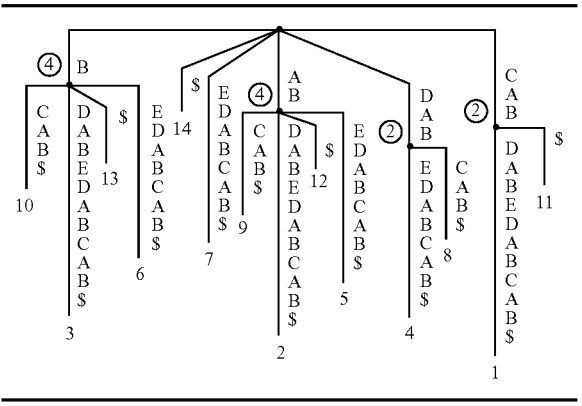

Selection and Confirmation

From the results of the frequency counting, the best patterns are selected based on heuristics. Using Table 3 as an example, patterns {A, B} and {B} are good candidates. And {A, B} is superior to {B} according to the heuristic "maximum coverage". However {A, B} can only cover a part of the elements because of outliers such as {C, D, E}. To cope with these outliers these patterns are expanded based on approximate similarity measurements and the heuristic "significant token". Currently a naïve method is used—starting from a strict pattern, we try to append succeeding elements after each object of the pattern. The consistency of the pattern is checked during the process and it stops if an appendant breaks the consistency. To illustrate the process, the steps of expanding pattern {A, B} are listed as follows:

$\{e_1, \{e_2, e_3\}, e_4, \{e_5, e_6\}, e_7, e_8, \{e_9, e_{10}\}, e_{11}, \{e_{12}, e_{13}\}\}$-->the original pattern {A,B}

$\{e_1, \{e_2, e_3, e_4\}, \{e_5, e_6\}, e_7, e_8, \{e_9, e_{10}\}, e_{11}, \{e_{12}, e_{13}\}\}$-->one element appended ......

$\{e_1, \{e_2, e_3, e_4\}, \{e_5, e_6, e_7\}, e_8, \{e_9, e_{10}, e_{11}\}, \{e_{12}, e_{13}\}\}$-->final result From the example we can see that heuristic "significant token" might sometimes miss possible patterns such as $\{\{e_1, e_2, e_3\}, \{e_4, e_5, e_6, e_7\}, \{e_8, e_9, e_{10}\}, \{e_{11}, e_{12}, e_{13}\}\}$, which do not have a "significant token" at the beginning.

Construction of a Structured Document

Structured documents are constructed in a recursive manner. Starting from basic objects and group objects, these elements are divided into potential composite objects roughly based on form-level tags. Then, the pattern detection algorithm is applied to elements of these potential composite objects, and detected patterns are converted to list objects. For example, using composite object and patterns of the section entitled "Selection and Confirmation" above, a new composite object can be created as $\{e_1, [\{e_2, e_3, e_4\}, \{e_5, e_6, e_7, e_8\}, \{e_9, e_{10}, e_{11}\}, \{e_{12}, e_{13}\}]\}$ where the element in square brackets is a list object. Note that outliers between two list elements are appended as do-not-cares. The composite objects are then expanded to upper levels by merging objects on the same level if they are not enclosed in important structures. After expanding, a check is performed to ascertain whether two adjacent list objects are similar and, if so, they are merged into one. The whole process then repeats until <BODY> of HTML document has been processed. The final composite object is the structured document.

Special Considerations for HTML Tables

In this section, application of the above-described visual cue-based method for analyzing structures of HTML tables is described. Tables are the most frequently used layout tools of HTML pages. From regular data tables to general content layouts, tables provide a powerful way to control positions and alignments. Typical approaches such as that described in Hammer et al., *Extracting Semistructured Information from the Web*, Proc. Workshop on Management of Semistructured Data (PODS/SIGMOD'97), May 1997, require manually specifying rules and pattern strings to locate wanted data. Further, methods such as those described in Lim et al., *An Automated Approach for Retrieving Hierarchical Data from HTML Table*, In Proc. CIKM'99, 1999, Kansas City, Mo., pp. 466-474, take further steps by automatically analyzing data tables with titles and headers. These approaches, however, do not automatically decide if a table is data table.

As data tables are normally organized tidily, they should hold very strong visual similarity patterns. In addition, many general content tables also hold strong visual cues. The alignment nature of tables is thus used as a starting point for structural analysis. We start by counting the rows and columns of a table. All empty rows and columns are stripped, since these are only for spacing and other layout purposes. Subsequently, we check for rows and columns because column-wise and row-wise organizations are quite common for data tables. The first check determines whether the table gets heading and footing rows and columns (such as that specified by <TH> <THEAD> <TFOOT> tags). These tags are normally used when the table is a column-wise or row-wise data table. Then, the elements in rows and columns are compared to check if similarity consistency holds. If none of the above checks is successful, a more aggressive method is used. Specifically, the table is divided into smaller rectangular blocks and these blocks are checked for similarity consistency. The table is passed back to the pattern detector if all efforts fail.

Having detected the objects in a web page, the function-based object models can now be generated.

Basic FOM Generation for a Basic Object

The functional properties of a basic object are generally included in its HTML source content. Hence, by examining the HTML source content, the functional properties of the basic objects can be ascertained. In the specific HTML context, such can be accomplished by defining some basic rules and then programmatically using the rules to identify the functional properties. The following discussion describes some specific rules that pertain to, in this specific context, generation of a basic function-based object model for a basic object.

The presentation property can be determined by analyzing the HTML source and tags to extract the Media Type, Encoding Format and Layout information of an object.

The semanteme property can be determined by analyzing the content itself to extract the semantic layer.

The navigation property is the destination of a hyperlink contained in a basic object.

The decoration property varies between [0,1] according to the presentation and semanteme properties. Text/Video objects normally have a lower decoration value. The following objects generally have higher values to indicate that their main purpose is for decoration: general decoration symbols, lines and separators between objects, and objects with a "Background" property in an HTML tag.

The interaction property of a basic object can be one of the following three categories:
  Button for Object with the <button> tag and/or some button-like selection list.
  Input Text for Object with <Input . . . > or related tags.
  Display for interaction property of other Objects.

Basic FOM Generation for a Composite Object

The following are some basic rules, in this specific context, for generating the basic function-based object model of a composite object:
  The clustering relationship can be one of the following three categories:
    Complement: the root children are neighbors and have one or more different basic properties (such as Presentation or Semantic Layer).
    Parallel: the root children are neighbors and have similar basic properties.
    Table: the root children have a table tag and 2-dimensional clustering headers (column and row header).
  Presentation Relationship
    Time Order: generally no time sequence unless required by the Object.
    Space Order can be determined by analyzing the visual image of the content.
    Root children are generally separable except special cases (such as Object for input).

Specific FOM Generation

Specific FOM Generation for a Basic Object

As described above, the specific function-based object model represents an object with its category. For a basic object, its category is mainly determined by the major properties of the basic object and the properties of the father/brother objects. In the illustrated and described embodiment, a rule-based decision tree is applied to determine the category of basic object.

Figure 5:
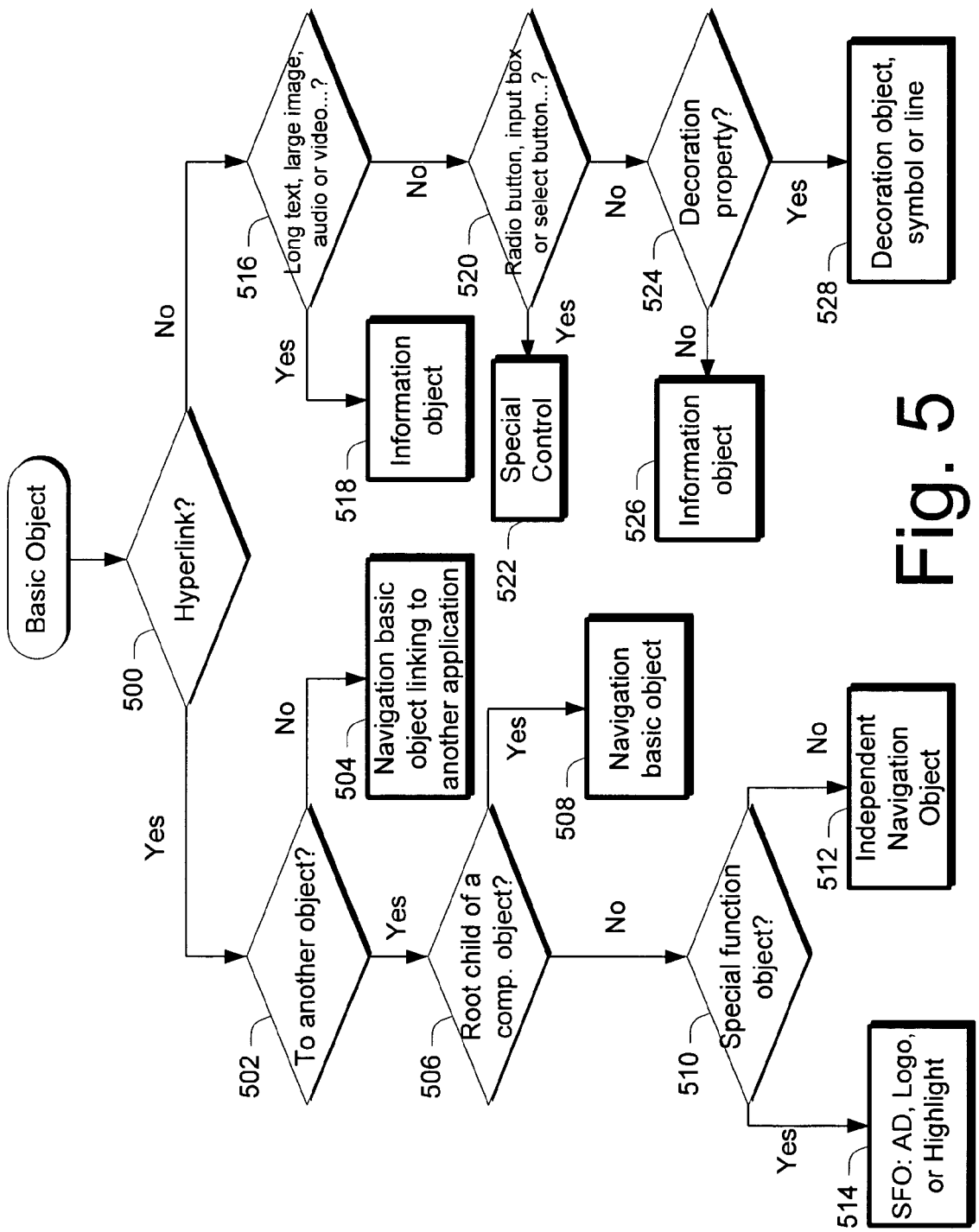
FIG. 5 is a flow diagram of a decision-making process in accordance with one or more embodiments.

As an example of a rule-based decision tree that can be utilized to ascertain the category of a basic object, consider FIG. 5.

Step 500 determines whether the basic object comprises a hyperlink. If it does, then step 502 determines whether the basic object comprises a hyperlink to another object. If the basic object is not a hyperlink to another object, then step 504 categorizes the basic object as a navigation basic object that links to another application. If, on the other hand, step 502 determines that the hyperlink is a link to another object, then step 506 determines whether the object is a root child of a composite object. If the object is a root child of a composite object, then step 508 categorizes the object as a navigation basic object. If, on the other hand, the object does not comprise a root child of a composite object, then step 510 determines whether the object is a special function object. If so, then step 514 categorizes the object as a special function object. If the object is not a special function object, then step 512 categorizes the object as an independent navigation object.

If, at step 500, the object is not determined to be a hyperlink, then step 516 determines whether the object comprises long text, large images, audio or video, or the like. If so, step 518 categorizes the object as an information object. If, on the other hand, none of these criteria are met, then step 520 determines whether the object comprises a radio button, input box, select box or the like. If the object does comprise one of these items, step 522 categorizes the object as a special control. If, on the other hand, the object does not comprise one of these items, step 524 determines whether the object comprises a decoration property. If not, then step 526 categorizes the object as an information object. If the object does comprise a decoration property, then step 528 categorizes the object as a decoration object, symbol, line or the like.

Specific FOM Generation for a Composite Object

The category of a composite object can be determined by the major properties of the composite object and/or its root children, as well as the application environment. Each different category can utilize a specific detection method that is specifically drawn along lines that are associated with that category. The specific detection methods can accordingly include one or more rules against which the various objects are tested to ascertain their category.

In the discussion that follows, and to assist the reader in appreciating this aspect of the described embodiments, two specific examples are given. The first example pertains to detecting and categorizing a normal navigation bar, and the second example pertains to detecting and categorizing a page. As will be appreciated and understood by those of skill in the art, the general principles of the examples about to be described can be extended to other categories.

EXAMPLE 1

Navigation Bar Detection

According to its media type, a normal navigation bar can be classified as either a "text" normal navigation bar or an "image" normal navigation bar. In this specific example, the focus will be on rules that detect a text normal navigation bar. Of course, an image normal navigation bar can also be detected with a similar method.

To ascertain whether a navigation bar is a text normal navigation bar in a website, the following rules can be employed.

| Rules for Text Normal Navigation Bar (NNB) | |
|---|---|
| Rule 1 | Most of the root children of a Text NNB should be navigation objects. That is: ($N_N/N_R$) should be not less than $H_{min}$, where $N_N$ is the total number of navigational root children, and $N_R$ is the total number of root children. |
| Rule 2 | Root children text length should be less than $L_{max}$. |
| Rule 3 | Text NNB appearance times in the website should be not less than $R_{min}$. |
| Rule 4 | Root children of a Text normal navigation bar should have similar properties. |
| Rule 5 | Root children of a Text normal navigation bar should have hyperlinks all to either outside or inside, only a small percentage of deviation $D_{max}$ is allowed. |

The constant variables above such as $H_{min}$, $L_{max}$, $R_{min}$ and $D_{max}$ are variable values that can vary in different websites according to the practical detection result.

Based on the rules above, a detection algorithm can be easily programmed. Small deviations can be allowed for the binary conditions in practical detection. That is, even if one of the values is slightly on the wrong side of a threshold, the corresponding text normal navigation bar can be accepted if all the other values are well away from their thresholds.

EXAMPLE 2

Page Category Detection

As described above, a web page has two basic categories: Index Page and Content Page. Presented here is a hyperlink-based page category detection method, which is effective for all languages based on XML.

In accordance with this method, the so-called "out degree" and "in degree" of a web page are defined. The out degree is the number of hyperlinks inside the page. The in degree is the number of web pages with hyperlinks to the current page in the whole website.

Using statistical analysis, it has been ascertained that a page with a relatively large out degree or in degree may be an index page, and a page with a relatively small out degree and in degree may be a content page. That is, for a given page with an out degree (OD) and an in degree (ID), the following rules can be used:

If OD>OD0 or ID>ID0, the page can be considered as an Index Page; and

If OD<OD0 and ID<ID0, the page can be considered as a Content Page, where, OD0 and ID0 are two constant variables determined by the website.

To find OD0 and ID0, we first sort the pages by OD and ID in descending order, respectively, and graph a corresponding OD(i)-i and ID(i)-i diagram of a website (i is the ordered number of a web page).

FIG. 6 gives an example of an OD(i)-i and ID(i)-i diagram for Yahoo's Chinese news website (1,615 pages in all). By statistical analysis of many websites, it has been determined that OD0 and ID0 correspond to the inflexion points in the OD(i)-i and ID(i)-i diagram as shown in FIG. 6.

Once the graphs of the corresponding OD(i)-i and ID(i)-i are made, there are two methods that have been found useful to ascertain OD0 and ID0.

The first method is referred to as a "beeline simulation", and is best understood in connection with FIG. 7. There, the graphed diagram is simulated with two beelines 700, 702. That is, the average distance between the beelines and the original curve of OD is minimized. Then the OD0 is calculated as the y-coordinate of the intersection of the lines 700, 702.

The second method is referred to as a polynomial simulation and is best understood with reference to FIG. 8. There, the graphed diagram is simulated with a polynomial curve 800 (second power or more). That is, the average distance between the polynomial and the original curve of OD is minimized. Then, the y-coordinate of the inflexion with the largest curvature of the polynomial curve is designed as OD0.

Exemplary Method

Figure 9:
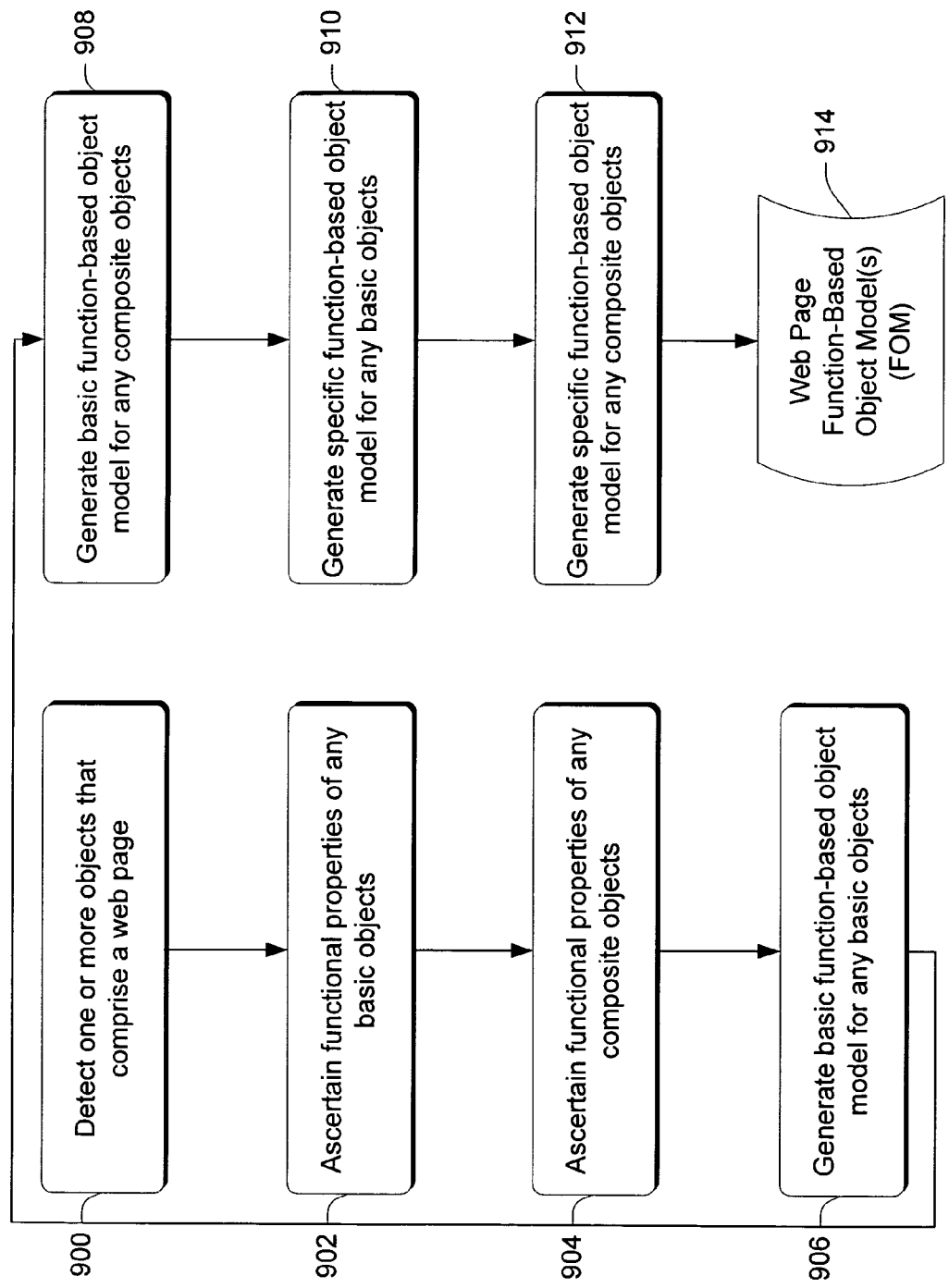
FIG. 9 is a flow diagram of steps in a method in accordance with one embodiment.

FIG. 9 is a flow diagram that describes steps in a method in accordance with the above-described embodiments. The method can be implemented in connection with any suitable hardware, software, firmware or combination thereof. In the illustrated and described example, the method is implemented in software. The method can be implemented by, among other types of computing devices, suitably configured client devices, as well as suitably configured servers that serve up web pages to client devices.

Step 900 detects one or more objects that comprise a web page. Exemplary objects are described above in the form of basic objects and composite objects. The exemplary objects are not intended to limit the objects that can be detected, or the object types that can be detected. Rather, the specifically discussed and described basic and composite objects are simply given as examples to illustrate the inventive approach. In addition, the objects can be detected in any suitable way. Specific examples of how this can be done in but one specific context are given. It is to be understood and appreciated that these specific examples are not to limit application of the claimed subject matter to either specific detection paradigms or detection of particular types of objects (e.g. HTML objects). Once detected, step 902 ascertains functional properties associated with any basic objects or first object types. Non-limiting examples of how this can be done are given above. Step 904 ascertains functional properties associated with any composite objects or second object types. Non-limiting examples of how this can be done are given above.

Step 906 generates basic function-based object models for any of the basic objects. Non-limiting examples of how this can be done are given above. Step 908 generates basic function-based object models for any composite objects. Non-limiting examples of how this can be done are given above. Step 910 generates specific function-based object models for any basic objects. Non-limiting examples of how this can be done are given above. Step 912 generates specific function-based object models for any composite objects. Non-limiting examples of how this can be done are given above. The result of Step 900 through 914 is data representing one or more function-based object models (FOM) that can be used to adapt web content for display on mobile devices. Non-limiting examples of how this step can be implemented are given below and are more particularly illustrated in FIG. 10a.

Mobile Control Technology and Language

A technology referred to herein as "Mobile control" can be effective in web content presentation in various mobile devices. Contemporary web page authors make use of various mark-up languages as an authoring language for a web page, such as the HTML authoring language. Mobile control technology is useful in automatically adapting desktop oriented websites for mobile devices based on a FOM and on mobile control technology. The FOM attempts to understand the intention of the author of a web page based on a functional analysis of the web content of the web page. The mobile control technology is expressed in an intermediary language called the "mobile control" language which enables web page authors to easily create web content that can be presented in various mobile devices. Based on the mobile control technology, automatic adaptation of websites for mobile devices can be achieved without any further effort on the part of the web page author.

The FOM attempts to understand the web page author's intention by identifying the function of an Object instead of a semantic understanding of the Object. Each Object in a website serves some specific function that reflects the web page author's intention towards the purpose of the Object.

Based on the FOM, an automatic website adaptation for mobile devices can be achieved without any further adaptation efforts on the part of the author of the web page. By representing the intention of the author of the web page with a FOM tree, web page content can be selected that is suitable to be displayed in mobile devices. The FOM tree also permits proper selection of a corresponding mobile control for web page content that is represented by an object. In this way a website having web pages written in a mark-up authoring language, such as HTML, that was originally created for a desktop display can be automatically adapted to display in various mobile devices by using a mobile control based mobile web page.

Mobile Control Based Mobile Web Page

Each Mobile Web page is a file that has a common path suffix, such as "*.aspx". Each"*.aspx" file can be further divided into multiple Mobile Forms. By declaring multiple Mobile Forms in a page, the author of the web page can use a higher level of factoring of the application into files.

A Mobile Form can be further subdivided into Mobile Panels. Mobile Panels are optional, and can be nested within other Mobile Panels. A Mobile Form is a separately addressable set of mobile controls that can be navigated to the application and from within the application.

Any number of mobile controls can be placed into an individual Mobile Form, and it is the runtime's job to break these mobile controls into multiple units for the appropriate target device. However, since a Mobile Form is considered a separate unit of discourse, the runtime never combines multiple Mobile Forms into a single screen.

Every Mobile Page must have at least one Mobile Form. At any time, a Mobile Page has one active Mobile Form. When the Mobile Page is first entered, the first Mobile Form is the active Mobile Form. The active Mobile Form can be changed programmatically, by setting the ActiveForm property of the Mobile Page. The mobile Link control also provides a way to change the active Mobile Form through user interaction. When the user clicks on the link, the mobile link control sets the ActiveForm property accordingly.

Mobile Panels provide a way of further grouping a set of mobile controls on the same Mobile Form. Mobile Panels are optional, and can be arbitrarily nested within Mobile Forms or other Mobile Forms.

Figure 12:
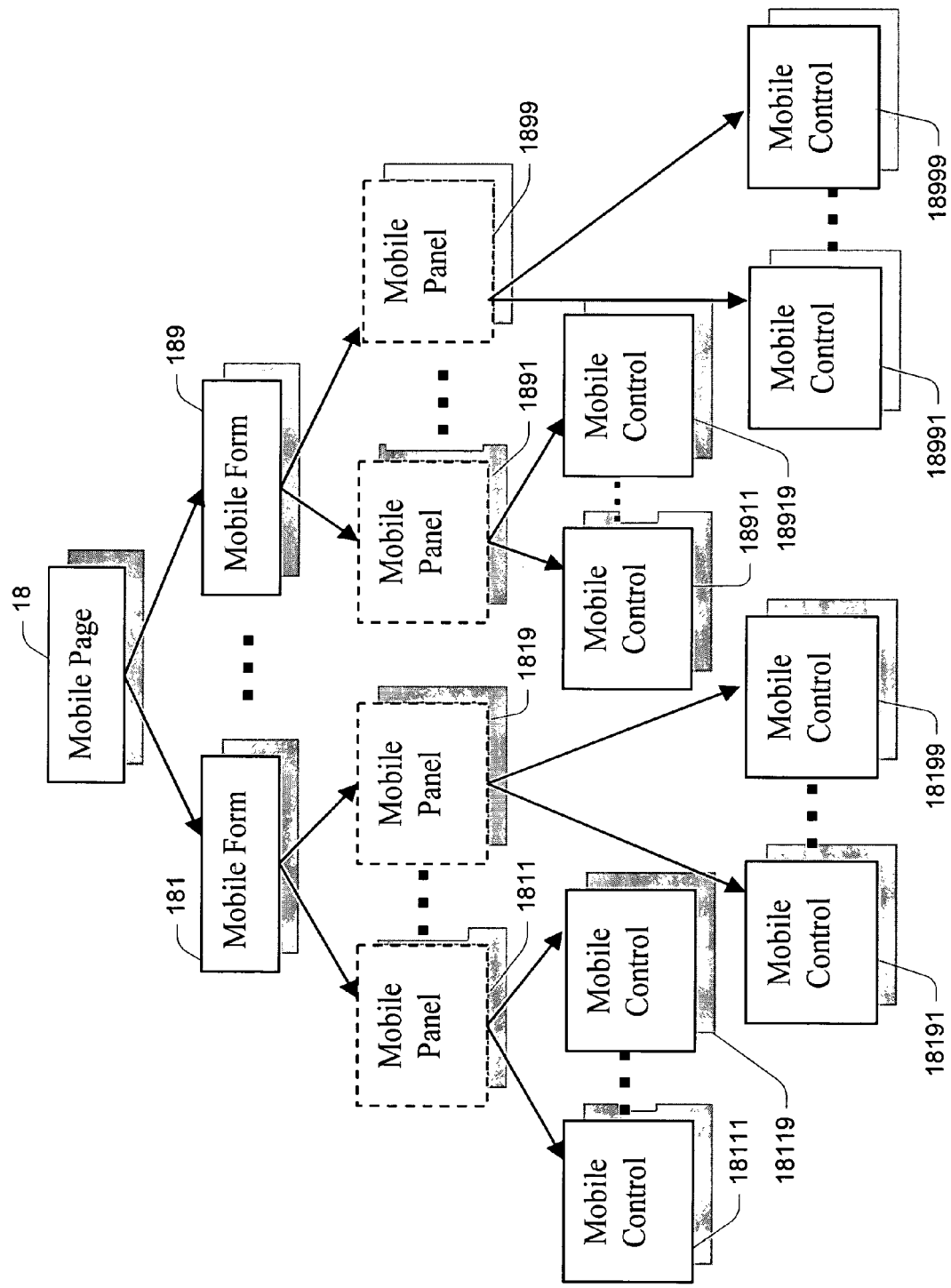
FIG. 12 is a diagram that is useful in understanding aspects of one or more described embodiments.

The leaves 18111 through 18999 of FIG. 12 are mobile controls. A mobile control itself may also consist of nested mobile controls. Mobile control is the basic element of a mobile web page. These mobile controls have events that the programmer can capture, and put code behind. The mobile controls allow the programmer to group content, get user input, navigate, or display tabular data. A large amount of mobile controls are provided to accomplish various functions. Due to the limitation of current adaptation technology, however, only some types of mobile controls are applied when adapting a website for mobile devices. These mobile controls include the Mobile Label Control, the Mobile TextView Control, the Mobile Link Control, the Mobile Image Control, the Mobile Command Control, and the Mobile TextBox Control.

The Mobile Label Control provides a programmable control for displaying small amounts of text. The Mobile TextView Control provides a programmable control for displaying larger amounts of text. The Mobile Link Control is a simple, text-based output only control that is used to represent a hyperlink to another Mobile Form on the Mobile Page or to an arbitrary URI. The Mobile Image Control is used to specify an image to display. The Mobile Command Control provides a way to post user input from user interface elements back to a server. The Mobile TextBox Control is a simple text-based control that allows the user to enter text input. FIG. 12 shows an example of a layered structure of a Mobile Page 18 where any of the foregoing Mobile Controls are used.

The structure of Mobile Page 18 in FIG. 12 shows a branch connecting a lower tier of Mobile Form 181 through Mobile Form 189. Mobile Form 181 has a lower tier of Mobile Panel 1811 through Mobile Panel 1819. Mobile Form 189 has a lower tier of Mobile Panel 1891 through Mobile Panel 1899. The dashed periphery of each Mobile Panel is an indication that the Mobile Panel is optional. Mobile Panels 1811, 1819, 1891, and 1899 have lower tiers of Mobile Controls which are, respectively, Mobile Control 18111 through Mobile Control 18119, Mobile Control 18191 through Mobile Control 18199, Mobile Control 18911 through Mobile Control 18919, and Mobile Control 18991 through Mobile Control 18999. While each lower tier seen in FIG. 12 has nine (9) elements, it is intended that each such lower tier could contain a greater or less number of elements. As such, each Mobile Panel may contain one or more Mobile Controls, and each Mobile Control itself may also consist of nested number of Mobile Controls.

FOM Information

A FOM is an abstract of an HTML web page. The layered structure of a FOM tree reflects the logical relationship of HTML content. The leafs of a FOM tree are Basic Objects. The corresponding HTML content can be extracted based on the index of a leaf.

A detailed description of a FOM tree structure is seen in Table 4, which lists the properties that are used in an adaptation process for Mobile Pages. In Table 4, a FOMPage represents a whole tree structure of a single Web Page and an Object represents each node in the tree structure of the FOMPage.

TABLE 4

| Property Name | Instruction | Value Limits |
| --- | --- | --- |
| FOMPage | | |
| URL | The URL of the page | Absolute URL(string) |
| PageFunc | Type of page: index or content | _PAGE_UNKNOWN(0) _PAGE_INDEX(1) _PAGE_CONTENT(2) |
| PageTitle | Title of the page | String |
| WindowWidth | Parser window width size | Width(int) |
| WindowHeight | Parser window height size | Height(int) |
| PageRectWidth | Page width size | Width(int) |
| PageRectHeight | Page height size | Height(int) |
| Object | | |
| LayoutType | Type of the Layout object | _LAYOUT_UKNOWN(0) _LAYOUT_GROUP(1) _LAYOUT_LIST(2) _LAYOUT_NODE(3) _LAYOUT_STRUCT(4) _LAYOUT_MEDIA(5) |
| FOMType | Type of the FOM object | _FOM_BO(1) _FOM_CO(2) |
| BOFunc | BO's function of the object | _FUN_NAVIGATIONAL\| _FUN_DECORATIVE\| _FUN_INTERACTIVE\| _FUN_INFORMATIVE\| _FUN_NONE\| |
| SFOMFunc | SFOM function of the object | _SFOM_UNKNOWN(0) _SFOM_INFOR(1) _SFOM_NAVBAR(2) _SFOM_NAVLIST (3) _SFOM_AD(4) _SFOM_LOGO(5) |

TABLE 4-continued

| Property Name | Instruction | Value Limits |
| --- | --- | --- |
| | | _SFOM_CONTACT(6) |
| | | _SFOM_HIGHLIGHT(7) |
| MediaType | Media type of content | _MEDIA_UNKNOWN(0) |
| | | _MEDIA_TEXT(1) |
| | | _MEDIA_IMG(2) |
| | | _MEDIA_VIDEO(3) |
| | | _MEDIA_AUDIO(4) |
| LayoutFormat | Layout format of CO | _LAYOUT_LEFT(1) |
| | | _LAYOUT_RIGHT(2) |
| | | _LAYOUT_CENTER(3) |
| Semantic Layer | Semantic layer of Object | _LAYER_KEYWORD(1) |
| | | _LAYER_HEADLINE(2) |
| | | _LAYER_ABSTRACT(3) |
| | | _LAYER_CONTENT(4) |
| EncodingFormat | Encoding format of media | _CODING_BMP(1) |
| | | _CODING_JPG(2) |
| | | _CODING_GIF(3) |
| | | _CODING_WAV(4) |
| | | _CODING_MPEG(5) |
| | | _CODING_AVI(6) |
| | | _CODING_MIDI(7) |
| Decoration | Decoration property | "0": not a pure decoration Object |
| | | "1": a pure decoration Object |
| Hyperlink | Hyperlink property | "0": has no hyperlink |
| | | "1": has hyperlink |
| Href | Hyperlink reference | String |
| Interaction | Interaction property | "0": has no interaction function |
| | | "1": has interaction function |
| Cluster | Clustering relationship | _CLUSTER_COMPLEMENT(1) |
| | | _CLUSTER_PARALLEL(2) |
| | | _CLUSTER_TABLE(3) |
| Presentation | Presentation relationship | _PRESENT_VERTICAL(1) |
| | | _PRESENT_HORIZONTAL(2) |
| | | _PRESENT_SEQUENCE(3) |
| | | _PRESENT_TIME(4) |
| Integration | Integration relationship | "0": children can be separated |
| | | "1" children can not be separated |
| SourceIndex | Index of the object in FOM tree | Index number in the Document Object Model (DOM) tree(int) |
| ChildSourceIndex | Index of the object in FOM tree | Child Source Index number in the DOM tree(int) |
| ObjectRectLeft | Position of the object | StartPoint left(int) |
| ObjectRectTop | Position of the object | StartPoint top(int) |
| ObjectRectWidth | Position of the object | StartPoint witdth(int) |
| ObjectRectHeight | Position of the object | StartPoint height(int) |

In Table 4, LayoutType describes the logical layout property of an Object. Some possible values of LayoutType are: _LAYOUT_UNKNOWN, _LAYOUT_GROUP, _LAYOUT_LIST, _LAYOUT_NODE, _LAYOUT_STRUCT, _LAYOUT_MEDIA, and _LAYOUT_FORM. The LayoutType has value limits that include _LAYOUT_UKNOWN, _LAYOUT_GROUP, _LAYOUT_LIST, _LAYOUT_NODE, _LAYOUT_STRUCT, and _LAYOUT_MEDIA. The value _LAYOUT_LIST is intended to represent objects in a FOM tree that include children having a similar presentation scheme. The value _LAYOUT_MEDIA is intended to represent objects in a FOM tree that have only a single node with only media content. The value _LAYOUT_NODE comes from original HTML Document Object Module (DOM) tree and is intended to represent data that is without a definition and therefore takes on this value. The value _LAYOUT_STRUCT and LAYOUT_FORM are intended to represent the layout properties of a composite object. If the corresponding content included inside a node were written in HTML FORM format, which is a techniques used in HTML to provide user input, then the layout property of that node/object is LAYOUT_FORM. By default, the layout properties of a composite object will be LAYOUT_STRUCT, which means that the content included inside the current node is organized in a structure. This default property value is set only if the detected layout property of the current node is not determined to be LAYOUT_GROUP, LAYOUT_LIST, LAYOUT_MEDIA, etc.

In Table 4, SFOMFunc describes the specific function of an object. Some possible values of SFOMFunc are: _SFOM_UNKNOWN, _SFOM_INFOR, _SFOM_NAVBAR, _SFOM_NAVLIST, _SFOM_INDNAV, _SFOM_INTERACTION, _SFOM_DECORATION, _SFOM_AD, _SFOM_LOGO, _SFOM_CONTACT, _SFOM_HIGHLIGHT, and_SFOM_COPYRIGHT.

In Table 4, MediaType describes the media type of an Object. Some possible values of MediaType are: _MEDIA_UNKNOWN, _MEDIA_TEXT _MEDIA_IMG, _MEDIA_VIDEO, and_MEDIA_AUDIO.

System Architecture

Figure 10A:
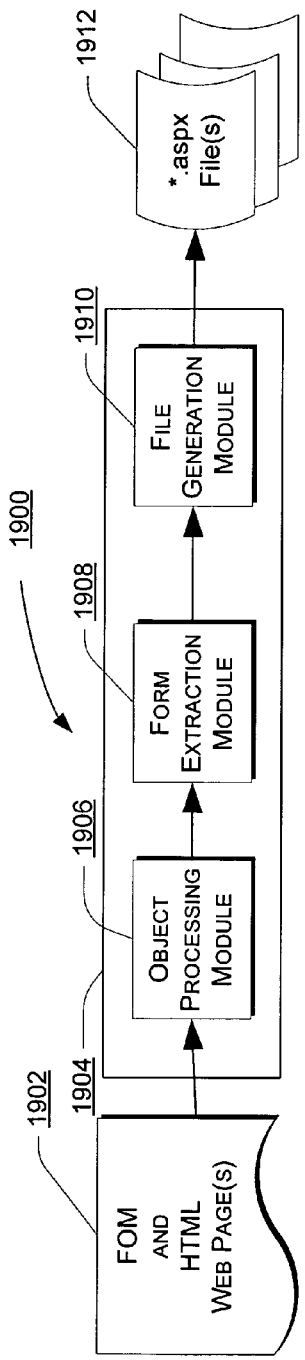
FIGS. 10a-10b are flow diagrams of a decision-making process in accordance with one or more embodiments.

FIG. 10a shows an implementation of a system architecture for adapting an HTML website to mobile controls for mobile devices. The input of the system is HTML page and FOM tree for the page. The HTML page serves as data source and FOM tree indicates the function and logical relationship of web content in the web page. From the Source Index and Child Source Index we can extract corresponding content of a FOM tree node from the original web page.

The output of the system is a series of mobile web pages. Since an HTML page for desktop may be too large to display in a small mobile device, it is generally divided into several small mobile pages. An index page will be generated, which provides navigation aid to these pages.

FIG. 10a shows three (3) modules in an architecture 1904, including an object processing module 1906 which receives an HTML Web Page and its FOM 1902, a form extraction module 1908 that receives output from object processing module 1906, and file generation module 1910 that receives output from form extraction module 1908. The output from file generation module 1910 is one or more Mobile Web Pages 1912. Each of the three (3) modules in an architecture 1904 are discussed below.

In one implementation, object processing module 1906 seen in FIG. 10a associates a mobile control with each object, which are seen as mobile controls 18111 through 18999 in FIG. 12. In one implementation, form extraction module 1908 seen in FIG. 10a provides results like that seen in FIGS. 11a-11c. In one implementation, file generation module 1910 seen in FIG. 10a forms a hierarchical structure similar to that seen in FIG. 12 and outputs one or more Mobile Web Pages 1912 seen in FIG. 10a. As such, the result of the three (3) modules in an architecture 1904 is a hierarchical structure similar to that seen in FIG. 12.

Object Processing Module

The objective of the object processing module 1906 is to decide which object in a FOM tree should be skipped for a mobile device. Additionally, the object processing module 1906 attempts to associate the object that may be displayed in mobile web page with a certain mobile control.

Since FOM has provided the function and logical structure information of all the objects in a web page, a decision can be made whether to skip an object for a mobile web page based on the rules set forth in Table 5. At the same time it can also be decided how to make an adaptation for the objects that can be displayed in mobile web page according to the object-mobile control relationship set forth in Table 6.

TABLE 5

Rules used in Object Selection

| Property on FOM | Value of Property | Action |
| --- | --- | --- |
| SFOMFunc | _SFOM_DECORATION | Discard |
|  | _SFOM_INTERACTION |  |
|  | _SFOM_NAVBAR | If "Content Page", Discard |
|  |  | If "Index Page", Retain |
|  | _SFOM_UNKNOWN | Retain |
|  | _SFOM_INFOR |  |
|  | _SFOM_NAVLIST |  |
|  | _SFOM_AD |  |
|  | _SFOM_LOGO |  |
|  | _SFOM_CONTACT |  |
|  | _SFOM_HIGHLIGHT |  |
| LayoutType | _LAYOUT_GROUP | Retain |
|  | _LAYOUT_LIST |  |
|  | _LAYOUT_FORM | Discard |
|  | _LAYOUT_NODE | No action |
|  | _LAYOUT_STRUCT |  |
|  | _LAYOUT_MEDIA |  |

TABLE 6

Relationship between Objects and Mobile Controls

| Objects | Corresponding Mobile Controls |
| --- | --- |
| Normal Text | Mobile Label Control or Mobile TextView Control |
| Text with Link | Mobile Link Control |
| Image | Mobile Image Control |
| Image with Link | Mobile Image Control with NavigateURL Property Set |
| Button | Mobile Command Control |
| Input Box | Mobile TextBox Control |

Form Extraction Module

Figure 10B:
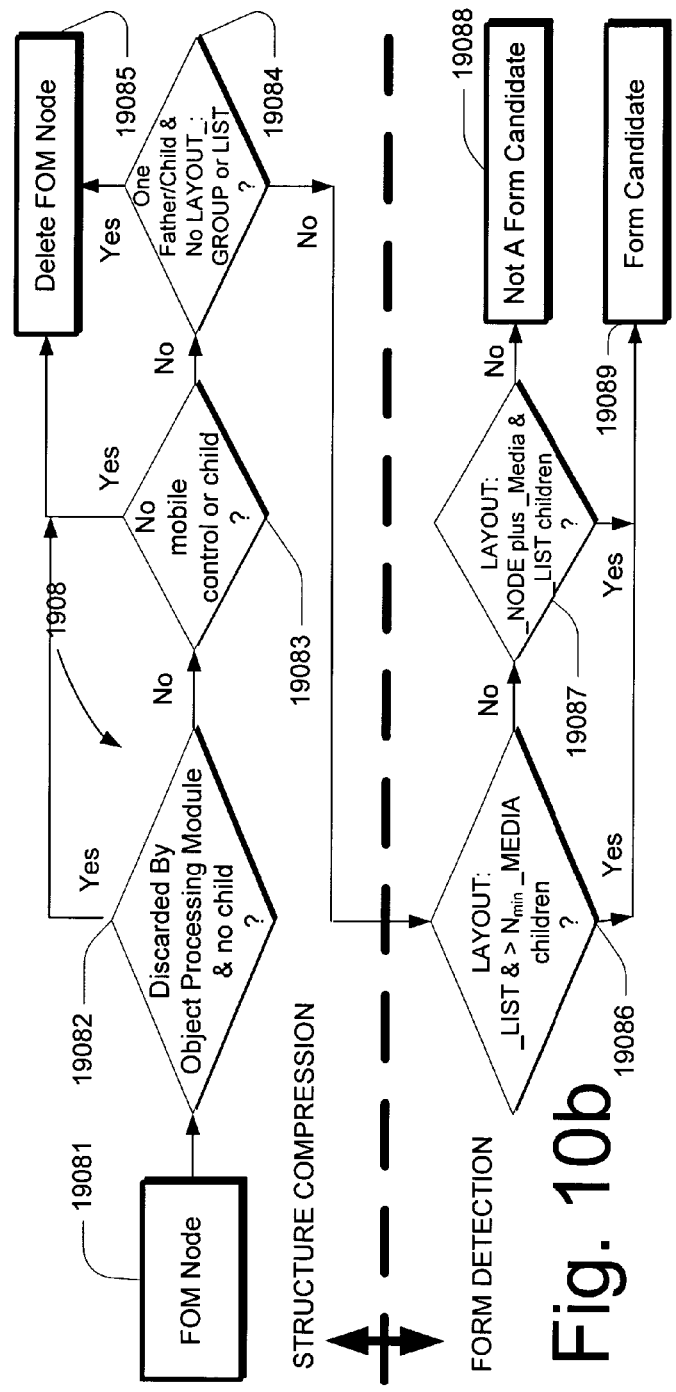

The processing of form extraction module 1908 is seen in FIG. 10b where the logical layered structure of a FOM tree is first checked to see if it can be compressed in blocks 19081 through 19085. Then, a check is made to see if a Mobile Form can be detected in blocks 19086 through 19089. Stated otherwise, form extraction module 1908 has the objective to compress the FOM tree logical layered structure and then detect the possible Mobile Forms that may be suitable to be displayed in a mobile web page.

As seen in FIG. 10b, each FOM node 19081 is subjected to a first query 19082 where the FOM Node of the FOM tree logical layered structure is deleted if the FOM Node has no sub-node and if the FOM Node was discarded in the object processing module 1906. A second query 19083 is then made as to whether the FOM Node has no corresponding mobile control, which can be judged from the result of the object processing module 1906, and whether the FOM Node has no sub-node, in which case the FOM Node is deleted at block 19085. _The queries 19082 and 19083 with resulting FOM Node deletion at block 19085 decrease the number of useless FOM Nodes in a FOM tree. To further compress the logical layered structure of a FOM tree, a third query 19084 will result in the deletion of the FOM Node at block 19085 if the FOM Node has only one father node and one child node, and has no LAYOUT_GROUP or LAYOUT_LIST property.

FIG. 11a gives an example of a FOM Tree where the third query 19084 results in the deletion of the FOM Node at block 19085, where FIG. 11a is the original FOM tree logical layered structure that contains LAYOUT_NODE 202 and FIG. 11b is the compressed structure where LAYOUT_NODE 202 has been deleted.

Blocks 19086 through 19089 represent a process for detecting whether a FOM Node is a candidate for being a Mobile Form. The purpose of detecting Mobile Forms in a web page is to divide the whole page into logic-related Mobile Forms, which is the basis of page segmentation. By way of example of page segmentation, as seen in FIG. 12, Mobile Page 18 is segmented into a plurality of Mobile Forms 181 through 189.

There are basic and special rules for Mobile Form detection. The Basic Rule is tested at a query 19086 to determine whether the FOM Node has a LayoutType property of _LAYOUT_LIST with more than $N_{min}$ children whose LayoutType properties are _LAYOUT_MEDIA. If so, then the FOM Node is deemed at block 19089 to be a candidate of a Mobile Form. Here, $N_{min}$ is an experience value where the default value is 4. FIG. 11c shows an example of the basic rule. The Special Rule is tested at a query 19087 to determine whether the FOM Node has a _LAYOUT_NODE property, a first child of _LAYOUT_MEDIA, and a second child of _LAYOUT_LIST. If so, then the FOM Node is deemed at block 19089 to be a candidate to be a Mobile Form. If not, then the FOM Node is deemed at block 19088 not to be a candidate to be a Mobile Form.

File Generation Module

The goal of File Generation Module 1910 is to generate mobile control based mobile page files as the adaptation result.

In the Object Processing Module 1906, each object that will be kept is associated with a corresponding mobile control. The property value of each object can be extracted from the HTML source file 1902. Mobile Forms are identified in the Form Extraction Module 1908. In the File Generation Module 1910, Mobile Web Pages 1912 are generated, where each Mobile Form that was identified in the Form Extraction Module 1908 corresponds to one (1) mobile web page file (*.aspx file) 1912 that is generated in the File Generation Module 1910. As such, the File Generation Module 1910 generates *.aspx files as well as an index for each mobile web page file to ensure that users can easily navigate in each Mobile Form.

Rendering to a Mobile Device

Figure 13:
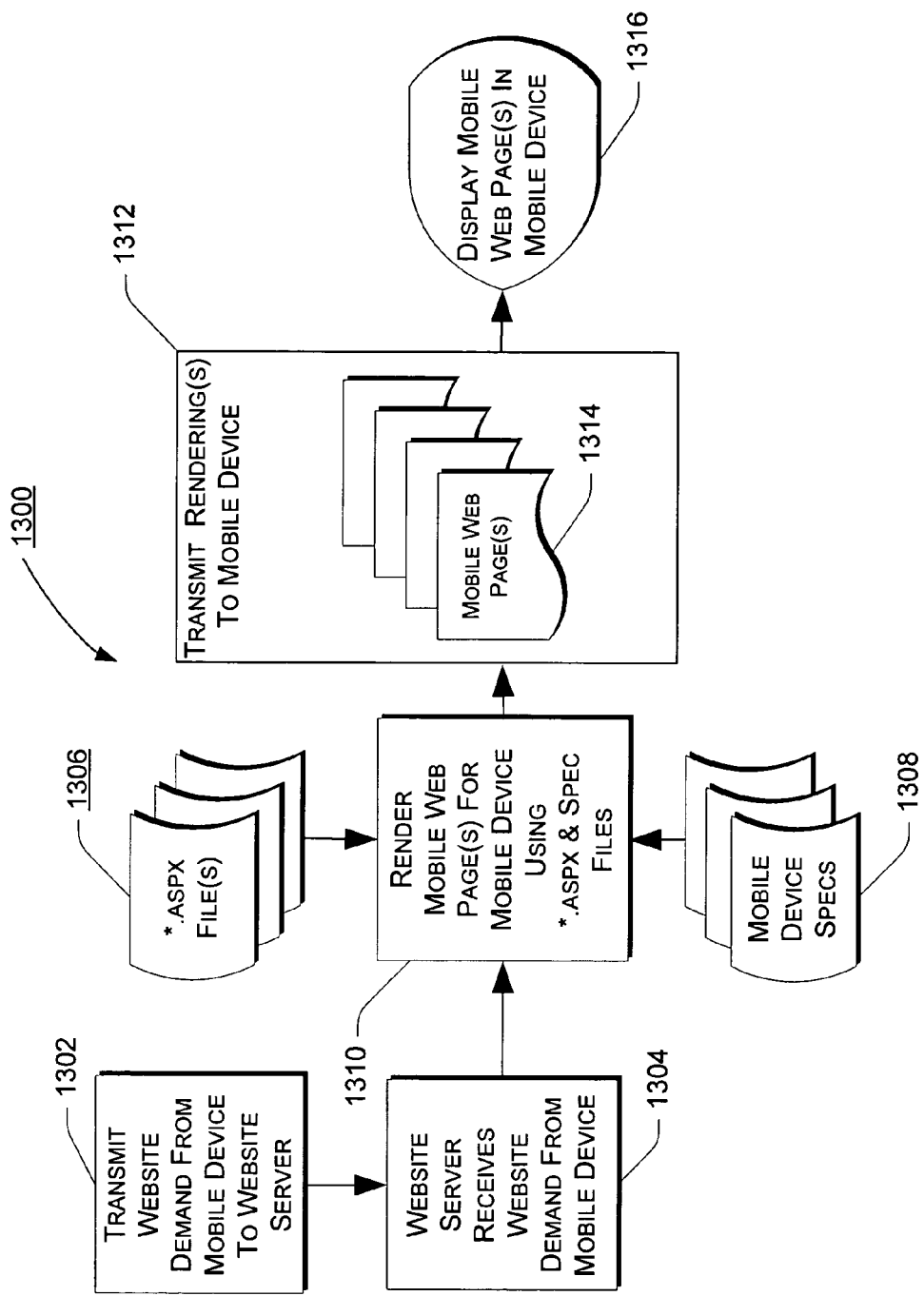
FIG. 13 is a flow diagram of a decision-making process in accordance with one or more embodiments.

After a Web page originally authored in a mark up language (e.g. HTML) has been processed to obtain its corresponding FOM, and then has been translated into an intermediary markup language, such as the Mobile Control language, a mobile device can request the Web page. A non-limiting example of such a demand and corresponding fulfillment is seen in FIG. 13 in a process 1300. Block 1302 in process 1300 shows the transmission of a demand for a website being transmitted from a mobile device to a website server. The website server receives the demand from the mobile device at block 1304. At block 1310, the website server processes the demand to render one or more mobile web pages. To do so, the website server uses one or more intermediary mark up language files corresponding to one or more web pages for website, which are seen in FIG. 13 as *.aspx files 1306. The website server also uses specifications corresponding to the demanding mobile device contained in one or more mobile device spec files 1308. As such there is an adaptation result of mobile web pages 1314 that are specifically suited for the particular demanding mobile device. By way of example, and not by way of limitation, the specifications for the demanding mobile device may indicate that the mobile device is capable of displays only in grey scale and not in color. The specifications may also provide particularities for the dimensions of the display screen of the mobile device, where a display screen of a demanding conventional cellular telephone may be somewhat smaller than that of a demanding conventional personal digital assistant (PDA). The mobile web pages 1314 are transmitted at block 1312 to the demanding mobile device for a display 1316. Depending upon the capabilities of the demanding mobile device, one or more functions seen in FIG. 13 can also be performed, in accordance with other implementations, by the mobile device, such as the rendering of mobile web pages from the corresponding intermediary mobile control language.

A technology called mobile web page simplifies the task of presenting web content to diverse mobile devices. Mobile web page makes use of a set of mobile controls as the basic page components for web content presentation in various mobile devices. Mobile control is an intermediary web presentation language. Different rendering drivers are applied for the generation of actual content presentation in different devices. Based on mobile control, web authors need only generate an intermediary website in an intermediary mark up language and the system will automatically adapt the website for various devices. Although mobile control is effective in web content presentation in various mobile devices, it is still not widely accepted and used. Therefore, a FOM based adaptation for mobile devices can be used to represent a web page author's intention for presenting the web page using a FOM tree, and through which content can be selected that is suitable to be displayed in mobile devices. The FOM based adaptation for mobile devices can also be used to decide a corresponding mobile control for a content object. In this way an HTML website originally created for a desktop can be automatically adapted to various mobile devices.

Exemplary Computer Environment

The embodiments described above can be implemented in connection with any suitable computer environment. Aspects of the various embodiments can, for example, be implemented, in connection with server computers, client computers/devices, or both server computers and client computers/devices. As but one example describing certain components of an exemplary computing system, consider FIG. 14.

FIG. 14 illustrates an example of a suitable computing environment 2200. It is to be appreciated that computing environment 2200 is only one example of a suitable computing environment and is not intended to suggest any limitation as to the scope of use or functionality of the inventive embodiments. Neither should the computing environment 2200 be interpreted as having any dependency or requirement relating to any one or combination of components illustrated in the exemplary computing environment 2200.

The inventive techniques can be operational with numerous other general purpose or special purpose computing systems environments or configurations. Examples of well known computing systems, environments, and/or configurations that may be suitable for use with the inventive techniques include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In certain implementations, the inventive techniques can be described in the general context of computer-executable instructions, such as program modules, being executed by a computer. Generally, program modules include routines, programs, objects, components, data structures, etc. that perform particular tasks or implement particular abstract data types. The inventive techniques may also be practiced in distributed computing environments where tasks are performed by remote processing devices that are linked through a communications network. In a distributed computing environment, program modules may be located in both local and remote computer storage media including memory storage devices.

In accordance with the illustrated example embodiment of FIG. 14 computing system 2200 is shown comprising one or more processors or processing units 2202, a system memory 2204, and a bus 2206 that couples various system components including the system memory 2204 to the processor 2202.

Bus 2206 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) buss also known as Mezzanine bus.

Computer 2200 typically includes a variety of computer readable media. Such media may be any available media that is locally and/or remotely accessible by computer 2200, and it includes both volatile and non-volatile media, removable and non-removable media.

In FIG. 14, the system memory 2204 includes computer readable media in the form of volatile, such as random access memory (RAM) 2210, and/or non-volatile memory, such as read only memory (ROM) 2208. A basic input/output system (BIOS) 2212, containing the basic routines that help to transfer information between elements within computer 2200, such as during start-up, is stored in ROM 2208. RAM 2210 typically contains data and/or program modules that are immediately accessible to and/or presently be operated on by processing unit(s) 2202.

Computer 2200 may further include other removable/non-removable, volatile/non-volatile computer storage media. By way of example only, FIG. 14 illustrates a hard disk drive 2228 for reading from and writing to a non-removable, non-volatile magnetic media (not shown and typically called a "hard drive"), a magnetic disk drive 2230 for reading from and writing to a removable, non-volatile magnetic disk 2232 (e.g., a "floppy disk"), and an optical disk drive 2234 for reading from or writing to a removable, non-volatile optical disk 2236 such as a CD-ROM, DVD-ROM or other optical media. The hard disk drive 2228, magnetic disk drive 2230, and optical disk drive 2234 are each connected to bus 2206 by one or more interfaces 2226.

The drives and their associated computer-readable media provide nonvolatile storage of computer readable instructions, data structures, program modules, and other data for computer 2200. Although the exemplary environment described herein employs a hard disk 2228, a removable magnetic disk 2232 and a removable optical disk 2236, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 2228, magnetic disk 2232, optical disk 2236, ROM 2208, or RAM 2210, including, by way of example, and not limitation, an operating system 2214, one or more application programs 2216 (e.g., multimedia application program 2224), other program modules 2218, and program data 2220. Some of the application programs can be configured to present a user interface (UI) that is configured to allow a user to interact with the application program in some manner using some type of input device. This UI is typically a visual display that is capable of receiving user input and processing that user input in some way. Such a UI may, for example, comprise one or more buttons or controls that can be clicked on by a user.

Continuing with FIG. 14, a user may enter commands and information into computer 2200 through input devices such as keyboard 2238 and pointing device 2240 (such as a "mouse"). Other input devices may include an audio/video input device(s) 2253, a microphone, joystick, game pad, satellite dish, serial port, scanner, or the like (not shown). These and other input devices are connected to the processing unit(s) 2202 through input interface(s) 2242 that is coupled to bus 2206, but may be connected by other interface and bus structures, such as a parallel port, game port, or a universal serial bus (USB).

A monitor 2256 or other type of display device is also connected to bus 2206 via an interface, such as a video adapter 2244. In addition to the monitor, personal computers typically include other peripheral output devices (not shown), such as speakers and printers, which may be connected through output peripheral interface 2246.

Computer 2200 may operate in a networked environment using logical connections to one or more remote computers, such as a remote computer 2250. Remote computer 2250 may include many or all of the elements and features described herein relative to computer 2200.

As shown in FIG. 14, computing system 2200 can be communicatively coupled to remote devices (e.g., remote computer 2250) through a local area network (LAN) 2251 and a general wide area network (WAN) 2252. Such networking environments are commonplace in offices, enterprise-wide computer networks, intranets, and the Internet.

When used in a LAN networking environment, the computer 2200 is connected to LAN 2251 through a suitable network interface or adapter 2248. When used in a WAN networking environment, the computer 2200 typically includes a modem 2254 or other means for establishing communications over the WAN 2252. The modem 2254, which may be internal or external, may be connected to the system bus 2206 via the user input interface 2242, or other appropriate mechanism.

In a networked environment, program modules depicted relative to the personal computer 2200, or portions thereof, may be stored in a remote memory storage device. By way of example, and not limitation, FIG. 14 illustrates remote application programs 2216 as residing on a memory device of remote computer 2250. It will be appreciated that the network connections shown and described are exemplary and other means of establishing a communications link between the computers may be used.

Conclusion

Compared to other approaches, the inventive approach described above has more satisfactory results and brings the same consistent browsing experience to users. Since an author's intention is well understood through the function-based object model analysis, the content adaptation is quite reasonable. For example, page function analysis (index/content page) has helped the decision making process, in WAP and other scenarios, as to whether to keep a navigation bar or not. Since the major purpose of an index page is to provide a navigation guide to users, the navigation bar is retained in the index page. On the contrary, the major purpose of the content page is to provide information to users, and, hence, the navigation bar can be considered as redundant information, and is therefore removed.

The described methods and systems are advantageously adaptable to different various websites because of the general nature of the approach. That is, the described embodiments can be based on visual information and functional property analysis instead of tag analysis. As a result, the methods are not only able to handle HTML based websites, but can also be easily extended to other web environment such as DHTML based websites (as set forth in the W3C).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A system comprising:

memory;

one or more processors coupled to the memory;

one or more computer-readable storage media;

computer-readable instructions on the one or more computer-readable storage media which, when executed by the one or more processors, cause the one or more processors to execute a method comprising:

analyzing one or more functions associated with a webpage, the analyzing being performed by generating at least a first function-based object model and a second function-based object model that both represent objects comprising the webpage; and forming a hierarchical structure of the webpage based on said analyzing, the hierarchical structure being formed by measuring an approximate similarity and a parallel similarity of the objects and detecting potential similarity patterns among the objects, wherein the objects comprise:

one or more basic objects associated with the webpage, the one or more basic objects comprising a smallest functional information body that cannot be further divided and still retain a basic object function, the one or more basic objects being configured to perform one or more of the following functions: (1) providing semantic information, (2) navigating to other objects, (3) providing a visual effect on the webpage, and (4) enabling a user interaction; and one or more composite objects associated with the webpage, the one or more composite objects comprising objects that contain other objects, the one or more composite objects having a clustering function;

wherein the first function-based object model describes functional properties of the one or more basic objects and the one or more composite objects; the second function-based object model categorizes the one or more basic objects and the one or more composite objects; and the analyzing comprises combining the first function-based object model and the second function-based object model.

2. The system of claim 1, wherein said generating of the one or more function-based object models comprises generating multiple function-based object models each of which being generated as a function of multiple different properties that can be associated with associated objects.

3. The system of claim 1, wherein said generating of the one or more function-based object models comprises generating at least one function-based object model for a basic object, said at least one function-based object model being generated as a function of one or more of the following properties: (A) a presentation property that defines a way in which the object is presented, (B) a semanteme property associated with content of an object, (C) a decoration property pertaining to an extent to which the basic objects serves to decorate the webpage, (D) a hyperlink property pertaining to an object to which the basic object points via a hyperlink, and (E) a interaction property pertaining to an interaction method of the basic object.

4. The system of claim 1, wherein said generating of the one or more function-based object models comprises generating at least one function-based object model for a composite object, said at least one function-based object model being generated as a function of one or more of the following properties: (A) a clustering relationship property pertaining to a relationship among root children of the composite object, and (B) a presentation relationship property pertaining to a presentation order associated with the root children of the composite object.

5. The system of claim 1, wherein said generating of the one or more function-based object models comprises generating at least one specific function-based object model that serves to categorize an object.

6. The system of claim 5, wherein said generating of said at least one specific function-based object model comprises, for a basic object, generating said at least one specific function-based object model based upon properties of the basic object and properties associated with any father or brother objects.

7. The system of claim 5, wherein said generating of said at least one specific function-based object model comprises, for a composite object, generating said at least one specific function-based object model based upon properties of the composite object and any of its root children.

8. The system of claim 5, wherein said forming a hierarchical structure of the webpage based on said analyzing comprises using a rule-based decision tree to ascertain a category of an object.

9. The system of claim 1, further comprising:
paginating the webpage based on said hierarchical structure; and
adapting the paginated webpage for presentation on a device having device capabilities based on the hierarchical structure of the webpage and the device capabilities.

10. The system of claim 9, wherein the paginating the webpage based on said hierarchical structure further comprises generating an index for one or more pages of the paginated webpage.

11. The system of claim 10, further comprising:
receiving a request for the webpage from the device having the capabilities; and
transmitting the adapted paginated webpage and the index therefore to the device 12. The system of claim 1, wherein forming the hierarchical structure further comprises:
selecting one or more patterns based on heuristics; and
merging similar objects.

13. A system comprising:
memory;
one or more processors coupled to the memory;
one or more computer-readable storage media;
computer-readable instructions on the one or more computer-readable storage media which, when executed by the one or more processors, cause the one or more processors to execute a method comprising:
analyzing one or more functions associated with a webpage described in a first markup language; the analyzing being performed by generating one or more a first function-based object model and a second function-based object model that both represent objects comprising the webpage;
forming a hierarchical structure of the web page based on the analyzing; the hierarchical structure being formed by clustering the objects according to similarity measurements and counting a frequency of patterns in the clustered objects;
describing the webpage in a second markup language based on the hierarchical structure,
wherein the objects comprise:
one or more basic objects associated with the webpage, the one or more basic objects comprising a smallest functional information body that cannot be further divided and still retain a basic object function, the one or more basic objects being configured to perform one or more of the following functions: (1) providing semantic information, (2) navigating to other objects, (3) providing a visual effect on the webpage, and (4) enabling a user interaction;
one or more composite objects associated with the webpage, the one or more composite objects comprising objects that contain other objects, the one or more composite objects having a clustering function;
wherein the first function-based object model describes functional properties of the one or more basic objects and the one or more composite objects;
the second function-based object model categorizes the one or more basic objects and the one or more composite objects; and
the analyzing comprises combining the first function-based object model and the second function-based object model.

14. The system of claim 13, wherein said generating of the one or more function-based object models comprises generating multiple function-based object models each of which being generated as a function of multiple different properties that can be associated with associated objects.

15. The system of claim 13, wherein said generating of the one or more function-based object models comprises generating at least one function-based object model for a basic object, said at least one function-based object model being generated as a function of one or more of the following properties: (A) a presentation property that defines a way in which the object is presented, (B) a semanteme property associated with content of an object, (C) a decoration property pertaining to an extent to which the basic objects serves to decorate the webpage, (D) a hyperlink property pertaining to an object to which the basic object points via a hyperlink, and (E) a interaction property pertaining to an interaction method of the basic object.

16. The system of claim 13, wherein said generating of the one or more function-based object models comprises generating at least one function-based object model for a composite object, said at least one function-based object model being generated as a function of one or more of the following properties: (A) a clustering relationship property pertaining to a relationship among root children of the composite object, and (B) a presentation relationship property pertaining to a presentation order associated with the root children of the composite object.

17. The system of claim 13, wherein said generating of the one or more function-based object models comprises generating at least one specific function-based object model that serves to categorize an object.

18. A system comprising:
    memory;
    one or more processors coupled to the memory;
    one or more computer-readable storage media;
    computer-readable instructions on the one or more computer-readable storage media which, when executed by the one or more processors, cause the one or more processors to execute a method comprising:
    generating a logical layered structure for an original webpage by:
    detecting one or more objects that comprise a webpage, the one or more objects including basic objects and composite objects;
    ascertaining functional properties of the basic objects and generating them from a basic function-based object model (FOM);
    ascertaining functional properties of the composite objects and generating them from a basic FOM;
    generating a specific FOM (SFOM) for the basic objects using the ascertained functional properties thereof;
    generating an SFOM for the composite objects using the ascertained functional properties thereof;
    applying one or more rules to assemble the logical layer structure for the original webpage using the one or more of the basic objects, the composite objects, the basic FOM for the basic objects, the basic FOM for the composite objects, the SFOM for the basic objects, and the SFOM for the composite objects;
    generating one or more mobile page files by:
    performing an object processing process comprising:
    applying one or more rules to remove objects in the logical layered structure;
    associating each remaining object in the logical layered structure with a mobile control;
    performing a form extraction process comprising:
    applying one or more rules to remove one or more layers in the logical layered structure;
    applying one or more rules to segment the logical layered structure into forms;n
    performing a file generation process comprising:
    generating one or more mobile page files for each form segmented from the logical layered structure;
    generating an index for the one or more mobile page files; and
    wherein the basic FOM describes functional properties of the one or more basic objects and the one or more composite objects;
    the SFOM categorizes the one or more basic objects and the one or more composite objects; and
    the analyzing comprises combining the basic FOM and the SFOM.

19. The system of claim 18, further comprising:
    rendering a webpage, configured for a mobile device, for one or more of the mobile page files; and
    transmitting to the mobile device:
    the index for the mobile page files; and
    the one or more of the mobile page files.

20. The system of claim 18, wherein the rendering of a webpage further comprises:
    receiving a demand for the original webpage from the mobile device; and
    rendering the webpage applying one or more rules specific to the mobile device so as to be configured for the mobile device.

* * * * *